US012659130B2

(12) United States Patent
Boehler et al.

(10) Patent No.: US 12,659,130 B2
(45) **Date of Patent: *Jun. 16, 2026**

(54) TRAINING OPTIMIZATION OF REGRESSION TREES USING FULLY HOMOMORPHIC ENCRYPTION

(71) Applicant: SAP SE, Walldorf (DE)

(72) Inventors: Jonas Boehler, Karlsruhe (DE);
Anselme Tueno, Ettlingen (DE);
Christian Manz, Framersheim (DE)

(73) Assignee: SAP SE, Walldorf (DE)

( * ) Notice: Subject to any disclaimer, the term of this patent is extended or adjusted under 35 U.S.C. 154(b) by 208 days.

This patent is subject to a terminal disclaimer.

(21) Appl. No.: 18/533,080

(22) Filed: Dec. 7, 2023

(65) Prior Publication Data

US 2025/0192979 A1     Jun. 12, 2025

(51) Int. Cl.
*H04L 9/00*        (2022.01)
*G06N 5/01*        (2023.01)
*H04L 9/06*        (2006.01)
(52) U.S. Cl.
CPC ............... *H04L 9/008* (2013.01); *G06N 5/01* (2023.01); *H04L 9/0618* (2013.01)
(58) Field of Classification Search
CPC ......... H04L 9/008; H04L 9/0618; G06N 5/01; G06N 20/00
See application file for complete search history.

(56) References Cited

U.S. PATENT DOCUMENTS

| | | | | |
|---|---|---|---|---|
| 11,995,519 B2 * | 5/2024 | Gulin | ....................... | G06N 5/01 |
| 2020/0244437 A1 | 7/2020 | Ruan | | |
| 2021/0344478 A1 | 11/2021 | Sarpatwar | | |
| 2022/0036250 A1 * | 2/2022 | Wang | ....................... | G06N 5/04 |

OTHER PUBLICATIONS

Abspoel et al., "Secure Training of Decision Trees With Continuous Attributes," *Proceedings on Privacy Enhancing Technologies*, vol. 1, pp. 167-187, 2021.
Akavia et al., "Privacy-Preserving Decision Trees Training and Prediction," ACM Transactions on Privacy and Security, vol. 25, No. 3, Article 24, 30 pages, May 2022.
Lauter et al., "Protecting Privacy through Homomorphic Encryption," pp. 31-62, 2021.
Barni et al., "Secure Evaluation of Private Linear Branching Programs with Medical Applications," In *Computer Security—ESORICS 2009: 14th European Symposium on Research in Computer Security*, France, pp. 424-439, Sep. 21-23, 2009.
(Continued)

*Primary Examiner* — Pramila Parthasarathy
(74) *Attorney, Agent, or Firm* — Klarquist Sparkman, LLP

(57) ABSTRACT
A computer implemented method can receive n training samples including sample values corresponding to m attributes and respective target values (n and m are positive integers), duplicate the sample values corresponding to the m attributes, pack the sample values into ciphertexts based on a batching option, and train a regression tree using the ciphertexts. The training is configured to encrypt the regression tree through homomorphic operations on the ciphertexts.

18 Claims, 18 Drawing Sheets

(56) References Cited

OTHER PUBLICATIONS

Brakerski et al., "(Leveled) Fully Homomorphic Encryption without Bootstrapping," *ACM Transactions on Computation Theory (TOCT)*, vol. 6, No. 3, pp. 1-36, 2014.

Breiman, "Random Forests," *Machine Learning*, vol. 45, pp. 5-32, 2001.

Cheon et al., "Numerical method for comparison on homomorphically encrypted numbers," In *Advances in Cryptology—ASIACRYPT 2019: 25th International Conference on the Theory and Application of Cryptology and Information Security, Japan, Part II*, pp. 415-445, Dec. 8-12, 2019.

De Hoogh et al., "Practical Secure Decision Tree Learning in a Teletreatment Application," In *Financial Cryptography and Data Security: 18th International Conference, FC 2014, Barbados*, pp. 179-194, Mar. 3-7, 2014.

Frery et al., "Privacy-Preserving Tree-Based Inference with Fully Homomorphic Encryption," arXiv preprint arXiv:2303.01254, 2023.

Gentry, "A Fully Homomorphic Encryption Scheme," *Stanford University*, 209 pages, Sep. 2009.

Goldschmidt, "Applications of Division by Convergence," *Massachusetts Institute of Technology*, 44 pages, Jun. 1964.

Hyafil et al., "Constructing Optimal Binary Decision Trees is NP-Complete," *Information Processing Letters*, vol. 5, No. 1, pp. 15-17, May 1976.

Martin, "An Exact Probability Metric for Decision Tree Splitting and Stopping," In *Pre-proceedings of the Fifth International Workshop on Artificial Intelligence and Statistics*, pp. 379-385, Oct. 26, 1994.

Shamrat et al., A Comprehensive Study on Pre-Pruning and Post-Pruning Methods of Decision Tree Classification Algorithm, In *2021 5th International Conference on Trends in Electronics and Informatics (ICOEI)*, pp. 1339-1345.

Tai et al., Privacy-Preserving Decision Trees Evaluation via Linear Functions, In *Computer Security—ESORICS 2017: 22nd European Symposium on Research in Computer Security, Norway, Part II*, pp. 494-512, Sep. 11-15, 2017.

Wu et al., "Privately Evaluating Decision Trees and Random Forests," *Cryptology ePrint Archive*, 35 pages, 2015.

* cited by examiner

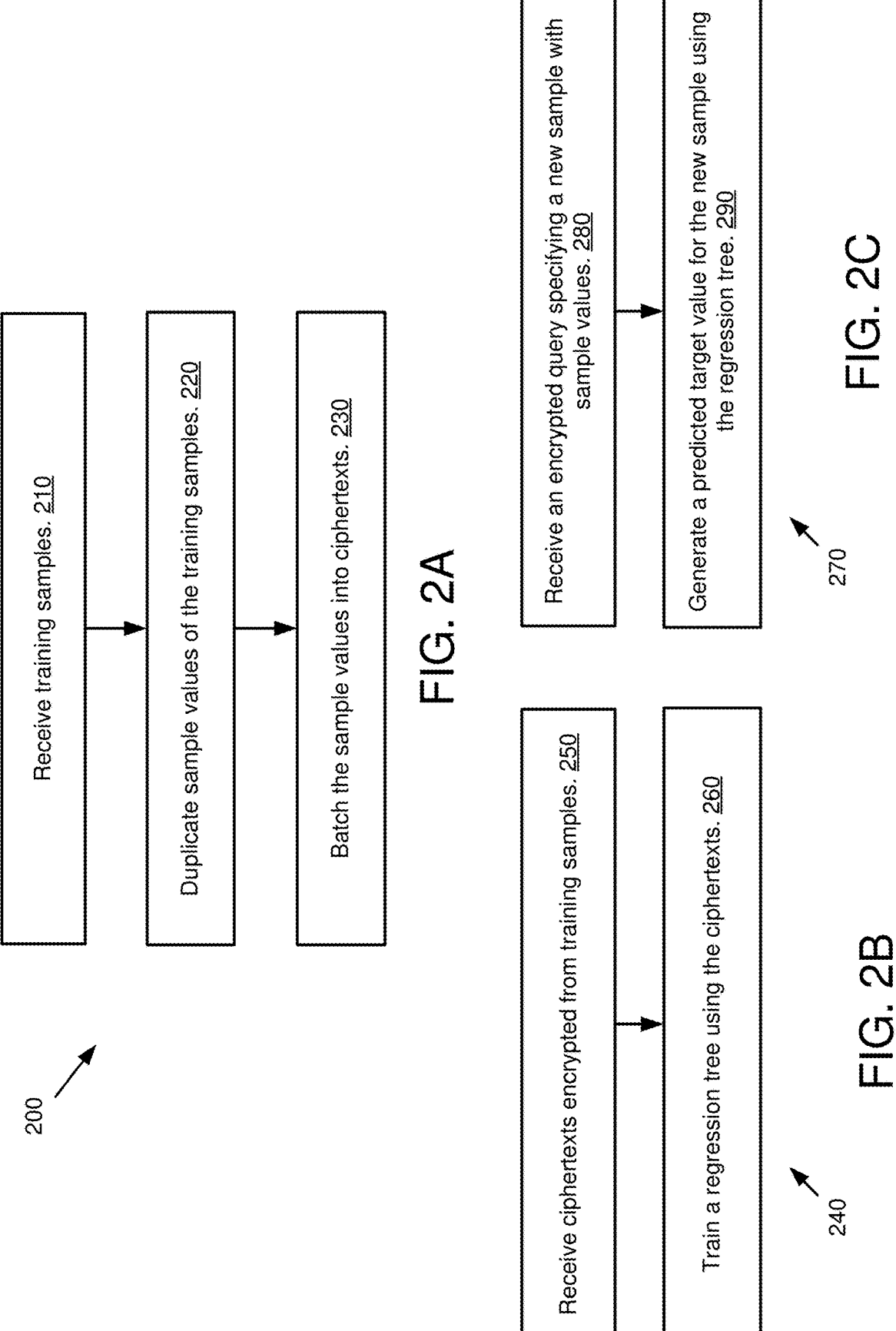

Receive training samples. 210

Duplicate sample values of the training samples. 220

Batch the sample values into ciphertexts. 230

FIG. 2A

Receive ciphertexts encrypted from training samples. 250

Train a regression tree using the ciphertexts. 260

FIG. 2B

Receive an encrypted query specifying a new sample with sample values. 280

Generate a predicted target value for the new sample using the regression tree. 290

FIG. 2C

Figure 6:
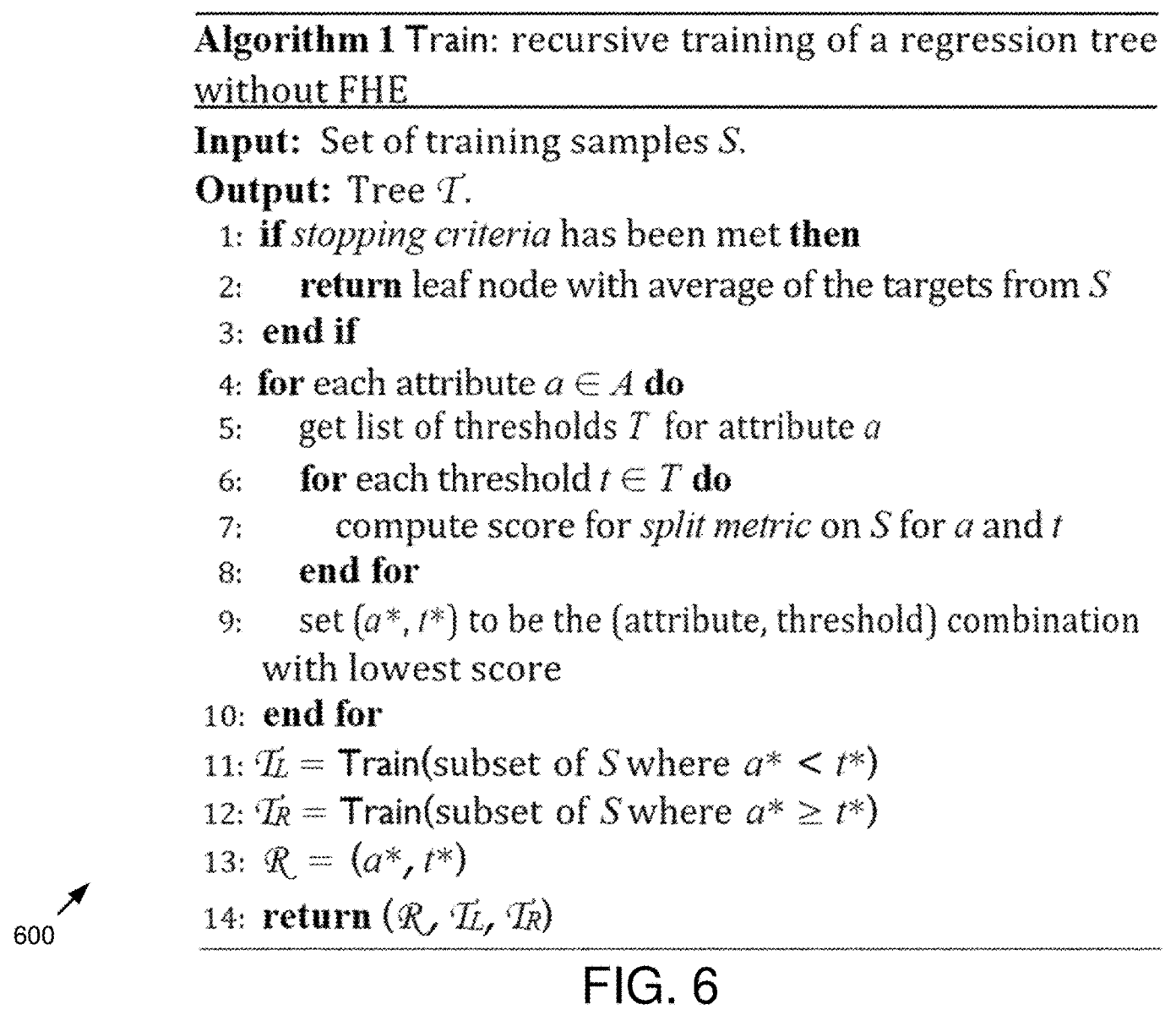

Algorithm 1 Train: recursive training of a regression tree without FHE

Input: Set of training samples $S$.
Output: Tree $\mathcal{T}$.

1: if *stopping criteria* has been been met then
2:    return leaf node with average of the targets from $S$
3: end if
4: for each attribute $a \in A$ do
5:    get list of thresholds $T$ for attribute $a$
6:    for each threshold $t \in T$ do
7:       compute score for *split metric* on $S$ for $a$ and $t$
8:    end for
9:    set $(a*, t*)$ to be the (attribute, threshold) combination with lowest score
10: end for
11: $\mathcal{T}_L = \mathrm{Train}(\text{subset of } S \text{ where } a* < t*)$
12: $\mathcal{T}_R = \mathrm{Train}(\text{subset of } S \text{ where } a* \geq t*)$
13: $\mathcal{R} = (a*, t*)$
14: return $(\mathcal{R}, \mathcal{T}_L, \mathcal{T}_R)$

Algorithm 2 mincopy

Input: Vector $v = (v_1,\ldots,v_n)$.

Output: Vector $v''$ with $n$ copies of the minimum in $v$.

1: $k = 1$   //Init
2: while $k \leq n$ do
3:   $v' = \mathrm{rot}(v,k) = (v_{k+1},\ldots,v_n,v_1,\ldots,v_k)$   //Rotate
4:   $v'' = (v''_1,\ldots,v''_m)$, where $v''_i = \min(v_i, v'_i)$   //Select
   element-wise minimum of $v$ and $v'$
5:   $v = v''$; $k = 2\cdot k$
6: end while

$v$
$v' = \mathrm{rot}(v,1)$
$w = v''$
$w' = \mathrm{rot}(w,2)$
$x = w''$
$x' = \mathrm{rot}(x,4)$
$x''$

FIG. 9B

Algorithm 3 Prerotate: copies single non-zero value within an attribute boundary to entire attribute.

Input: Vector $x = [x_1, x_2, \ldots, x_n]$ with a single non-zero value and threshold number $q$.

Output: Vector $x' = [x'_1, x'_2, \ldots, x'_n]$ with $q$ copies of the non-zero value within the attribute boundary.

// Expand values to the first attribute slot

1: for $stepSize = 1, \ldots, \log(q)$ do

2:     $x = x + \text{rot}(x, stepSize)$

3: end for

// Extract first slot for each attribute

4:     $mask = [y_1, \ldots, y_n]$ where $y_i = 1$ if $(i - 1) \bmod q = 0$ and 0 else.

5:     $x' = mask \times x$

// Expand first value to every attribute slot

6: for $stepSize = 1, \ldots, \log(q)$ do

7:     $x' = x' + \text{rot}(x', -stepSize)$

8: end for

9: return $x'$

| | | | | | | | | | | |
|---|---|---|---|---|---|---|---|---|---|---|
| input vector $x$ | 0 | 0 | 0 | 0 | 0 | 1 | 0 | | | |
| $x$ after rot($x$,1) (line 1) | 0 | 0 | 0 | 0 | 1 | 1 | 0 | | | |
| $x$ after rot($x$,2) (line 1) | 0 | 0 | 1 | 1 | 1 | 1 | 0 | | | |
| $mask$ (line 4) | 1 | 0 | 0 | 1 | 0 | 0 | 0 | | | |
| $x' = mask \times x$ (line 5) | 0 | 0 | 0 | 1 | 0 | 0 | 0 | | | |
| $x'$ after rot($x'$,-1) (line 7) | 0 | 0 | 0 | 1 | 1 | 0 | 0 | | | |
| $x'$ after rot($x'$,-2) (line 7) | 0 | 0 | 0 | 1 | 1 | 1 | 1 | | | |

FIG. 10B

Figure 12:
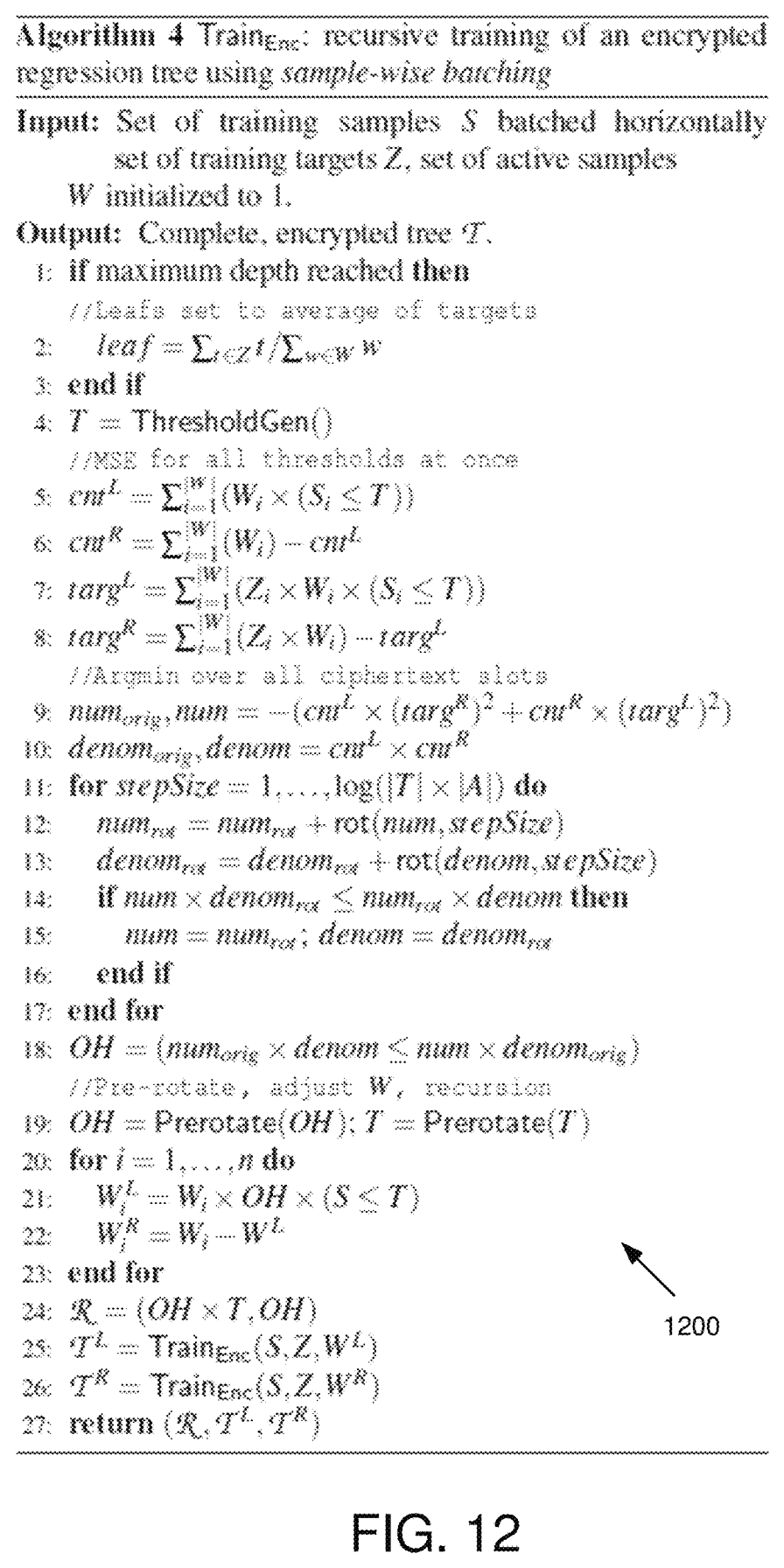

Algorithm 4 $\text{Train}_{Enc}$: recursive training of an encrypted regression tree using *sample-wise batching*

Input: Set of training samples $S$ batched horizontally set of training targets $Z$, set of active samples $W$ initialized to 1.

Output: Complete, encrypted tree $\mathcal{T}$.

1: if maximum depth reached then
   // Leafs set to average of targets
2:   $leaf = \sum_{t \in Z} t / \sum_{w \in W} w$
3: end if
4: $T = \text{ThresholdGen}()$
   // MSE for all thresholds at once
5: $cnt^L = \sum_{j=1}^{|W|} (W_j \times (S_j \leq T))$
6: $cnt^R = \sum_{j=1}^{|W|} (W_j) - cnt^L$
7: $targ^L = \sum_{j=1}^{|W|} (Z_j \times W_j \times (S_j \leq T))$
8: $targ^R = \sum_{j=1}^{|W|} (Z_j \times W_j) - targ^L$
   // Argmin over all ciphertext slots
9: $num_{orig}, num = -(cnt^L \times (targ^R)^2 + cnt^R \times (targ^L)^2)$
10: $denom_{orig}, denom = cnt^L \times cnt^R$
11: for $stepSize = 1, \ldots, \log(|T| \times |A|)$ do
12:   $num_{rot} = num_{rot} + \text{rot}(num, stepSize)$
13:   $denom_{rot} = denom_{rot} + \text{rot}(denom, stepSize)$
14:   if $num \times denom_{rot} \leq num_{rot} \times denom$ then
15:     $num = num_{rot}; denom = denom_{rot}$
16:   end if
17: end for
18: $OH = (num_{orig} \times denom \leq num \times denom_{orig})$
   // Pre-rotate, adjust $W$, recursion
19: $OH = \text{Prerotate}(OH); T = \text{Prerotate}(T)$
20: for $j = 1, \ldots, n$ do
21:   $W_j^L = W_j \times OH \times (S \leq T)$
22:   $W_j^R = W_j - W^L$
23: end for
24: $\mathcal{R} = (OH \times T, OH)$
25: $\mathcal{T}^L = \text{Train}_{Enc}(S, Z, W^L)$
26: $\mathcal{T}^R = \text{Train}_{Enc}(S, Z, W^R)$
27: return $(\mathcal{R}, \mathcal{T}^L, \mathcal{T}^R)$

COMPUTING ENVIRONMENT 1700

COMMUNICATION CONNECTION(S) 1770

1730 central processing unit 1710 graphics or co-processing unit 1715

MEMORY 1720

MEMORY 1725

INPUT DEVICE(S) 1750

OUTPUT DEVICE(S) 1760

STORAGE 1740

SOFTWARE 1780 IMPLEMENTING TECHNOLOGIES

1800

CLOUD COMPUTING SERVICES

1810

COMPUTING DEVICE 1820

COMPUTING DEVICE 1822

COMPUTING DEVICE 1824

TRAINING OPTIMIZATION OF REGRESSION TREES USING FULLY HOMOMORPHIC ENCRYPTION

BACKGROUND

Machine learning models require sensitive data for training, raising privacy concerns when training is outsourced or involves multi-party data. This is particularly challenging for heavily regulated industries like health and finance that cannot easily share data. Outsourcing forecasting model training to a cloud service involves sending potentially sensitive business-critical information to a cloud provider. For example, competitors producing similar goods may want to forecast future production quantities or stock changes based on historic business data. While each company only has a partial market view, their combined views can improve overall forecasting. However, sharing business-critical data can provide competitors with more insights than necessary. One solution is using a trusted third party, but this incurs additional costs, legal overhead, and creates a single point of attack. Thus, there is an opportunity for advancements in the secure training of forecasting models and their subsequent application for inference, ensuring both the privacy and utility of sensitive data.

BRIEF DESCRIPTION OF THE DRAWINGS

FIG. 2A is a flowchart illustrating an example overall method of encrypting training samples into ciphertexts.

FIG. 2B is a flowchart illustrating an example overall method of training a regression tree using the ciphertexts of FIG. 2A.

FIG. 2C is a flowchart illustrating an example overall method of performing inference using the regression tree of FIG. 2B.

FIG. 6 is a pseudo-code implementation of an algorithm for recursive training of a regression tree without fully homomorphic encryption.

FIG. 9A is a pseudo-code implementation of a mincopy algorithm.

FIG. 9B is an example use case illustrating the mincopy algorithm of FIG. 9A.

FIG. 10A is a pseudo-code implementation of a prerotate algorithm.

FIG. 10B is an example use case illustrating the prerotate algorithm of FIG. 10A.

FIG. 12 is a pseudo-code implementation of a fully homomorphic encryption training algorithm for training an encrypted regression tree using sample-wise batching.

FIG. 15 depicts results of performing additional steps (following the steps of FIG. 14) of the fully homomorphic encryption training algorithm of FIG. 12.

DETAILED DESCRIPTION

Figure 1:
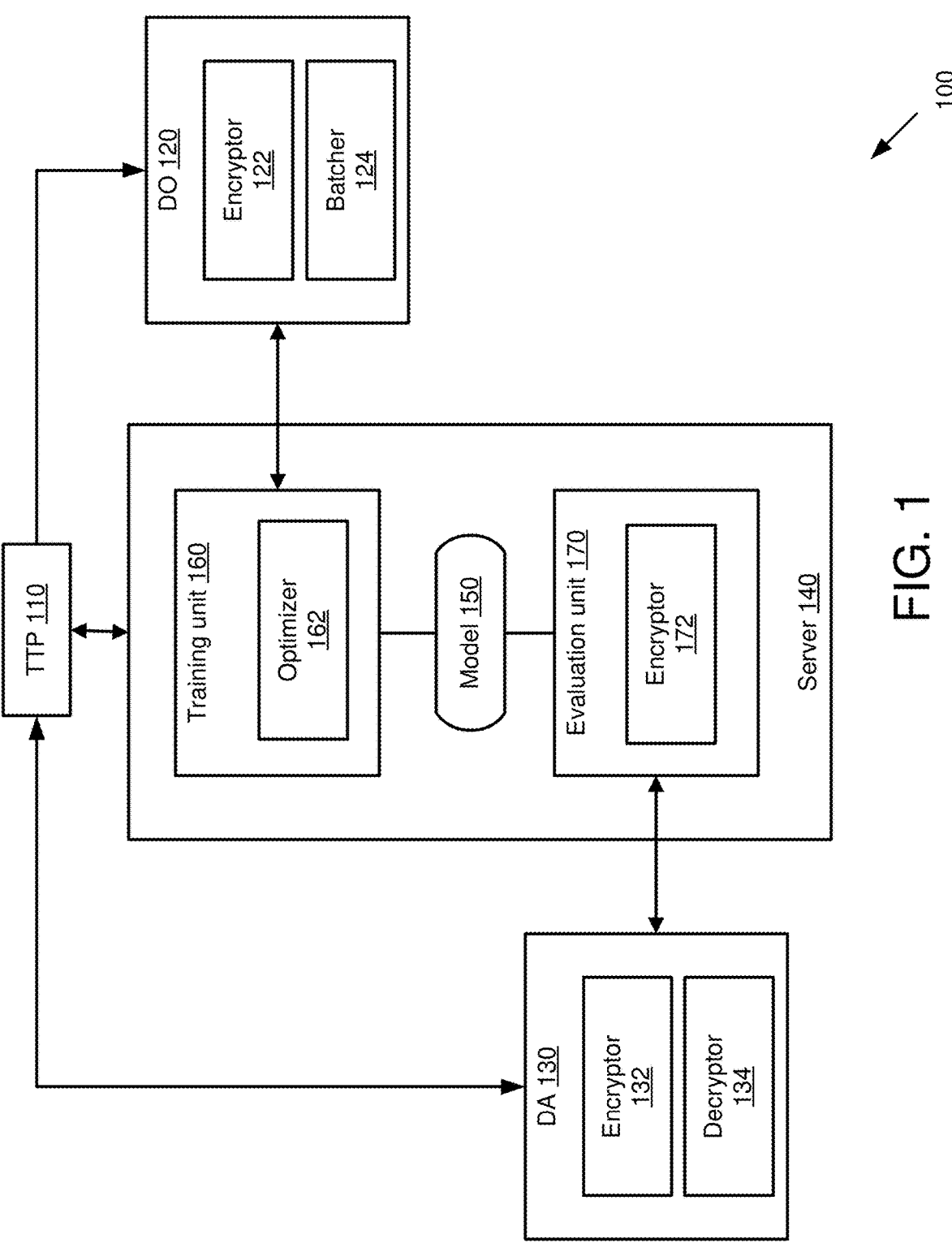
FIG. 1 is an overall block diagram of an example computing system for encrypted training of a tree-based forecasting model and using such model to inference.

Overview of Encrypted Training and Inference Methods

Machine learning, particularly in the realm of data forecasting, grapples with numerous technical challenges when it comes to training models on encrypted data. These challenges primarily arise from the necessity to strike a balance between ensuring data privacy and maintaining the utility of the models.

One of the main issues is the access to sensitive data. For effective training, machine learning models often require access to sensitive data. This becomes a significant concern in industries where data privacy is of utmost importance, such as healthcare and finance. The privacy concerns are further amplified when model training is outsourced or involves collaborations with multiple parties.

Another challenge lies in the constraints related to data sharing. Consider the scenario where companies producing similar goods aim to forecast future trends based on historical business data distributed across these companies. While combining their data could enhance overall forecasting, sharing business-critical data could potentially allow competitors to gain more insights than necessary for estimation.

A common approach to mitigate these concerns is the use of a trusted third party. However, this solution has its own limitations. Using a trusted third party can incur additional costs, necessitate legal overhead (e.g., due to the need for contracts and compliance with data protection regulations), and introduce a single point of attack (e.g., as all sensitive data is centralized, vulnerability to data breaches increases because a single data breach could lead to the release of data from all companies involved).

Fully homomorphic encryption (FHE) can be a promising solution to these issues. FHE allows computations over encrypted data without revealing its sensitive contents. However, implementing FHE in machine learning models presents its own set of challenges due to computational complexity and efficiency. Moreover, previous work mainly considers a simpler task of inference where a server evaluates an encrypted, pre-trained tree on an input from a client. When FHE is used for model training, most previous work requires interaction, that is, the client must decrypt intermediate results from the server and then send the encrypted results of local evaluations back to the server. Such an interactive approach to FHE in model training is undesirable because it requires constant communication between the client and the server, which can lead to increased latency and reduced efficiency. Additionally, the need for the client to decrypt intermediate results could potentially expose sensitive information, undermining the privacy benefits of FHE. Further, this interactive approach demands more computational resources and time from the client's side, which might not always be feasible or efficient.

The technologies described herein provide systems and methods for privacy-preserving, non-interactive training of tree-based machine learning models. As described more fully below, the technologies described herein include an innovative cryptographic protocol for training and prediction on regression trees, efficient batching options for increased training throughput, and optimizations to simplify computations and speed up later calculations.

As a result, the technologies described herein enable secure and efficient model training without compromising data privacy. Specifically, the non-interactive training allows clients to send encrypted inputs to a server and then go offline, reducing the need for constant interaction and potential exposure of sensitive information. The efficient batching options support large data sizes, enhancing training throughput. The computational optimizations not only simplify complex calculations involved in FHE but also expedite later computations, thereby improving the overall efficiency of the system.

Example Computing System with Query Parameterization Framework

FIG. 1 shows an overall block diagram of an example computing system 100 supporting implementation of encrypted training and inference methods for tree-based forecasting models.

The computing system 100 involves several entities, including a trusted third party (TTP) 110, a server 140, and one or more clients. The clients can include one or more data owners (DOs) 120 and one or more data analysts (DAs) 130.

The role of the TTP 110 is solely to generate and distribute keys, without any further involvement in the computation process. This setup is akin to the role of a trusted certificate authority in internet security. Just as a certificate authority issues digital certificates to authenticate the legitimacy of a website (for instance, confirming that a bank's website is indeed owned by the bank and not by a scammer), the TTP 110 in the computing system 100 ensures secure key distribution.

As described herein, a DO 120 is an entity who provides data samples to the server 140 for training a tree-based forecasting model (e.g., the model 150). Each data sample provided by the DO 120 can include sample values corresponding to multiple attributes (which can also be referred to as "features") and an associated target value. A DA 130 is an entity who submits sample values to the server 140. The sample values provided by the DA 130 correspond to the multiple attributes but are not associated with a target value. The DA 130 can receives an inference (i.e., a predicted target value generated using the tree-based forecasting model based on the sample values provided by the DA 130) from the server 140. Although only one DO 120 and one DA 130 are shown in FIG. 1, it should be understood that there can be multiple DOs 120 and/or multiple DAs 130. In FIG. 1, the DO 120 and DA 130 are shown as separate entities. In other examples, an entity can serve as both a DO and a DA.

Each DO 120 can have an encryptor 122 and a batcher 124. The encryptor 122 is configured to encrypt sample values into ciphertexts before sending the ciphertexts to the server 140. The batcher 124 is configured to implement a predefined batching option, which allows multiple sample values to be packed into one ciphertext to allow simultaneous testing of multiple thresholds for each attribute, as described more fully below.

The server 140 includes a training unit 160 and an evaluation unit 170. The training unit 160 is configured to generate a trained model 150 represented by a regression tree, based on the encrypted data samples received from the one or more DOs 120. Specifically, the training unit 160 is configured to encrypt the regression tree through homomorphic operations on the ciphertexts. The training unit 160 can include an optimizer 162 configured to implement various optimization schemes to expedite the FHE training process, as described more fully below.

As shown in FIG. 1, each DA 130 can have an encryptor 132 and a decryptor 134. The DA 130 can encrypt sample values using the encryptor 132, and then submit the encrypted sample values to the evaluation unit 170 of the server 140. Using the trained model 150, the evaluation unit 170 can generate an inference or predicted target value based on the encrypted sample values provided by a DA 130. The inference or predicted target value can be re-encrypted by an encryptor 172 included in the evaluation unit 170. The encrypted inference can be sent back to the DA 130, which can decrypt the encrypted inference using the decryptor 134, thereby obtaining the the predicted target value associated with the sample values submitted for evaluation.

In practice, the systems shown herein, such as the computing system 100, can vary in complexity, with additional functionality, more complex components, and the like. For example, there can be additional functionality within the server 140. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The computing system 100 and any of the other systems described herein can be implemented in conjunction with any of the hardware components described herein, such as the computing systems described below (e.g., processing units, memory, and the like). In any of the examples herein, the sample values, target values, ciphertexts, thresholds, and the like can be stored in one or more computer-readable storage media or computer-readable storage devices. The technologies described herein can be generic to the specifics of operating systems or hardware and can be applied in any variety of environments to take advantage of the described features.

Example Overall Methods for Encrypted Training and Inference

FIG. 2A is a flowchart illustrating an example overall method 200 of encrypting training samples (or simply "samples") into ciphertexts. FIG. 2B is a flowchart illustrating an example overall method 240 of training a regression tree using the ciphertexts. FIG. 2C is a flowchart illustrating an example overall method 270 of performing inference using the regression tree. The method 200 can be performed by the DO 120, and the methods 240 and 270 can be performed by the server 140 of FIG. 1.

Referring to FIG. 2A, training samples can be received at step 210. The number of training samples can be n, where n is a positive integer. Each training sample can include sample values corresponding to multiple attributes and an associated target value. For example, each training samples can have m sample values corresponding to m attributes, and a respective target value, wherein m is a positive integer.

At step 220, the sample values corresponding to the m attributes are duplicated. In some examples, the duplication can create q copies of the sample values included in the n training samples for each attribute, where q is an integer that is greater than one. For example, q can be a predefined integer between 1 and n. Generally, q defines a count of thresholds which are tested for each attribute when training a regression tree, as described more fully below.

At step 230, the sample values are packed or batched into ciphertexts based on a batching option. The ciphertexts can then be used by a training unit (e.g., the training unit 160) to train a regression-tree forecasting model.

Referring to FIG. 2B, ciphertexts encrypted from training samples are received at step 250. The ciphertexts can be generated as output of the method 200 and provided by one or more data owners (e.g., the DO 120).

Then at step 260, a regression tree can be trained using the ciphertexts. Specifically, the training can be configured to encrypt the regression tree through homomorphic operations on the ciphertexts, as described further below. Importantly, the training is performed independently by a server (e.g., the server 160) without interaction with any of the data owners. In other words, there is no need for the data owner to decrypt and evaluate intermediate results generated by the server during the training process. Thus, after sending ciphertexts to the server, the one or more data owners can go offline and the training can be performed by the server alone.

Referring to FIG. 2C, an encrypted query specifying a new sample is received at step 280. The encrypted query can be provided by a data analyst (e.g., the DA 130). The new sample can include sample values corresponding to the m attributes described above.

Then, at step 290, an encrypted prediction (or an inference) of a target value for the new sample can be generated using the regression tree.

The methods 200, 240, 270, and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Cryptographic Protocol for Encrypted Training and Inference

Figure 3:
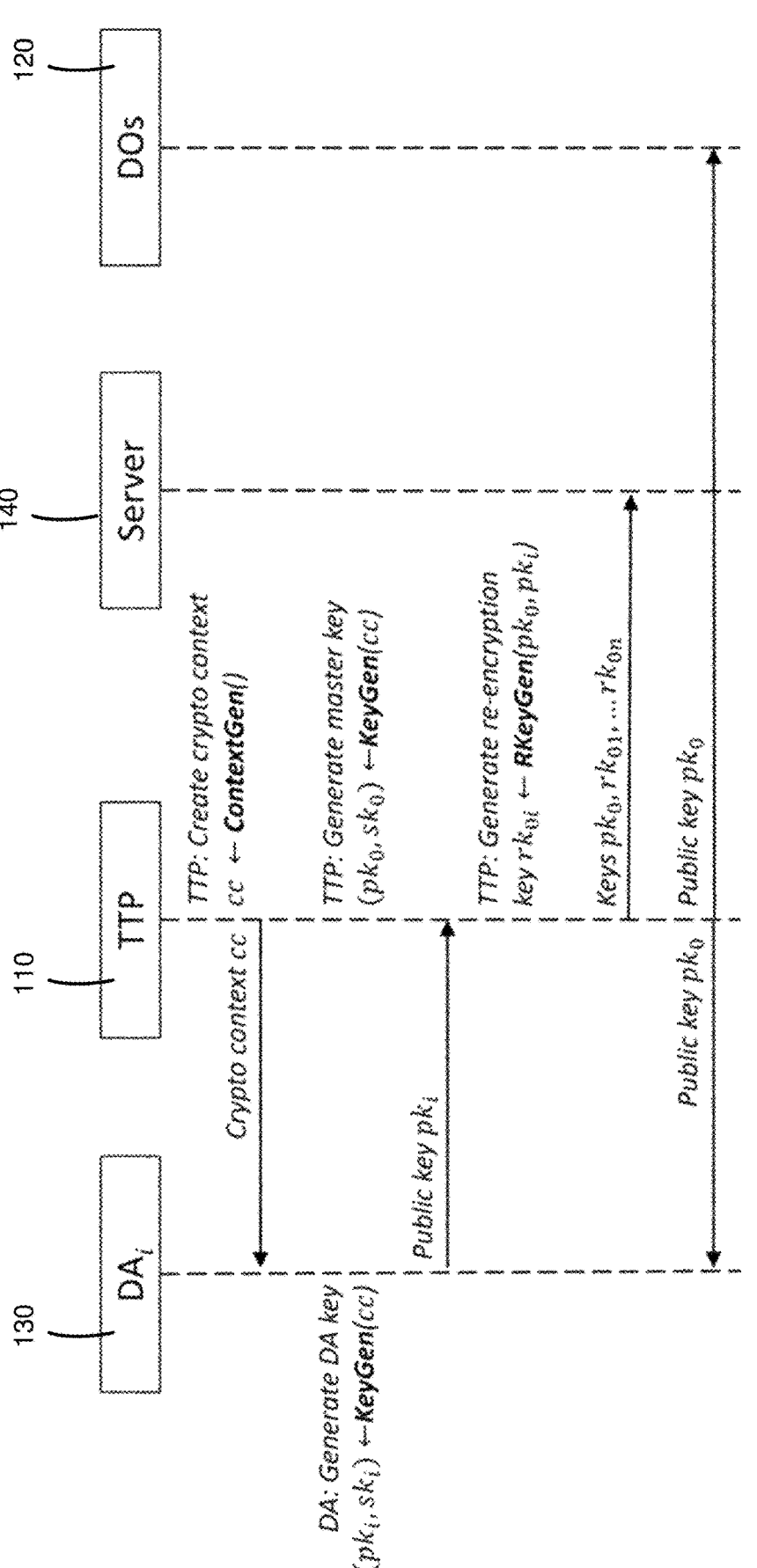
FIG. 3 depicts operations involved in a setup phase of a cryptographic protocol for training a forecasting model and using such model for inference.
Figure 4:
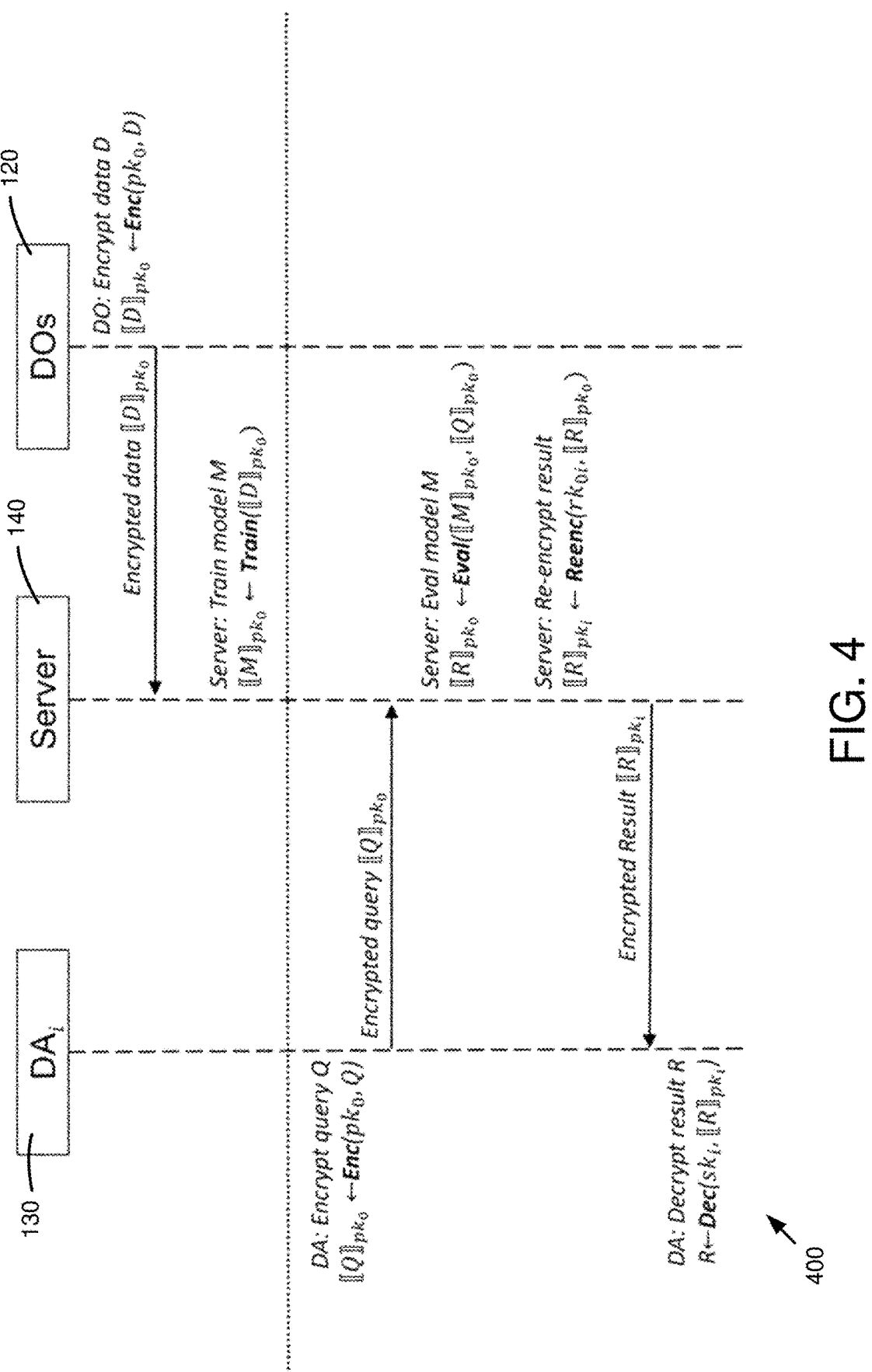
FIG. 4 depicts operations involved in a training phase and an inference phase for the cryptographic protocol of FIG. 3.

FIGS. 3-4 depicts operations involved in different phases of a cryptographic protocol for training a forecasting model and using such model for inference.

The protocol consists of three phases: a setup phase as shown in FIG. 3, a training phase as shown in the top part (above the dotted line) of FIG. 4, and an inference phase as shown in the bottom part (below the dotted line) of FIG. 4. The setup phase involves the TTP 110, the server 140, one or more DOs 120 (denoted as $DO_s$), and one or more DAs 130 (denoted as $DA_i$). The training and inference phases involve the same entities except for the TTP 110.

During the setup phase (FIG. 3), the TTP 110 first creates and shares a crypto context (denoted as cc), which is a data structure defining one or more cryptographic setup parameters (e.g., security level, selected encryption algorithm, etc.), which can be used to generate the following set of keys:

A master public-private key pair ($pk_0$, $sk_0$) generated by the TTP (e.g., by calling a KeyGen function).

A public-private key pair ($pk_i$, $sk_i$) generated by each DA (e.g., by calling the same KeyGen function) for i∈{1, . . . , p}, where p is the number of DAs.

A set of re-encryption keys $rk_{0i}$ generated by the TTP (e.g., by calling a RKeyGen function) for each DA, where i∈{1, . . . , p}. The RkeyGen function can be the same as or different from the KeyGen function.

Then, $pk_0$ is distributed by the TTP 110 to all clients (including all DOs 120 and DAs 130). Additionally, the keys $pk_0$, $pk_i$ and $rk_{0i}$ are sent to the server 140.

During the training phase (FIG. 4 top), each DO 120 can use $pk_0$ to encrypt its data set of training samples into ciphertexts (denoted as $[\![ D ]\!]_{pk0}$) based on a selected batching option, and send the encrypted ciphertexts to the server 140. After receiving all encrypted ciphertexts, the server 140 can non-interactively (i.e., without help from the DOs 120) train an encrypted regression tree model using an algorithm 1200 illustrated in FIG. 12 and described further below.

During the inference phase (FIG. 4 bottom), a DA 130 (e.g., with index i) can query the trained regression tree model by encrypting its query (denoted as using $pk_0$ (e.g., by calling an encryption function Enc) and send the encrypted query (denoted as $[\![ Q ]\!]_{pk0}$) to the server 140. The server 140 processes the query on the encrypted regression tree model (e.g., by calling an evaluation function Eval) to compute an encrypted prediction result encrypted under $pk_0$ denoted as $[\![ R ]\!]_{pk0}$). The server 140 further uses a corresponding re-encryption key (e.g., $rk_{0i}$) to re-encrypt the prediction result $[\![ R ]\!]_{pk0}$ under $pk_i$ to generate a re-encrypted prediction result (denoted as $[\![ R ]\!]_{pki}$). The re-encrypted prediction result is then sent back to the DA 130, which can decrypt it (e.g., by calling a decryption function Dec) to obtain the unencrypted prediction result (denoted as R).

Example Notations

For simplicity, the following notations are used in the following descriptions. For a data vector x, the encryption of x is denoted by $[\![ x ]\!]$. For a data set S including n training samples, i.e., $S=\{s_1, . . . , s_n\}$, where $s_k$ represents the k-th training sample (1≤k≤n). The size of the data set S is denoted by |S|.

For a given integer l∈[1, . . . , L], let $1_{OH}=(l_1, . . . , l_L)$ denote a one-hot (or 1-hot) encoding of l where $l_j=1$ if j=l and $l_j=0$ otherwise (j≠l).

It is further assumed that training data is given as a table with n rows, each representing a simple training sample with m columns, one for each attribute (the table can be transposed if rows correspond to different attributes and columns correspond to different training samples).

Every training sample can be expressed as a vector containing sample values corresponding to the attributes and an associated target value. For example, the i-th training sample can be expressed as $$d_i = (x_i^1, . . . , x_i^m, y_i),$$

which contains a sample value $$x_i^j$$

for the j-th attribute (where j=1, . . . , m) and a corresponding target value $y_i$. Note that the target value is present in the training samples used for training the regression tree, and the goal of the trained regression tree is to predict or infer a target value given sample values where the target value is not present.

Additionally, it is assumed that each attribute j has a set $T_j$ of thresholds, where $|T_j|=q$ for all attributes (i.e., each attribute has q thresholds).

Example Regression Tree

Regression trees can be used for modeling relationships between input variables and continuous output values. Regression trees are closely related to classification trees. The former predicts numerical values and the latter categories.

Generally, a regression tree is a hierarchical, binary decision tree used in machine learning for regression tasks. More specifically, a regression tree includes nodes organized in multiple layers and edges connecting between some of the nodes. The nodes include one or more inner nodes and a plurality of leaf nodes. An inner node has two child nodes, whereas a leaf node has no child node.

The inner nodes represent test conditions for corresponding attributes (sometimes also referred to as "feature conditions"). The test condition represented by an inner node can be expressed in the form of data comparison $a \leq t_a$, where a represents an attribute and $t_a$ is a threshold corresponding to that attribute. The edges represent outcomes of evaluating the sample values based on the test conditions (sometimes also referred to as "decision paths").

The leaf nodes represent predictions of the target values (sometimes also referred to as "regression predictions"). During prediction or inference, an input sample traverses the tree, and its output is the value associated with the leaf node it reaches.

Figure 5:
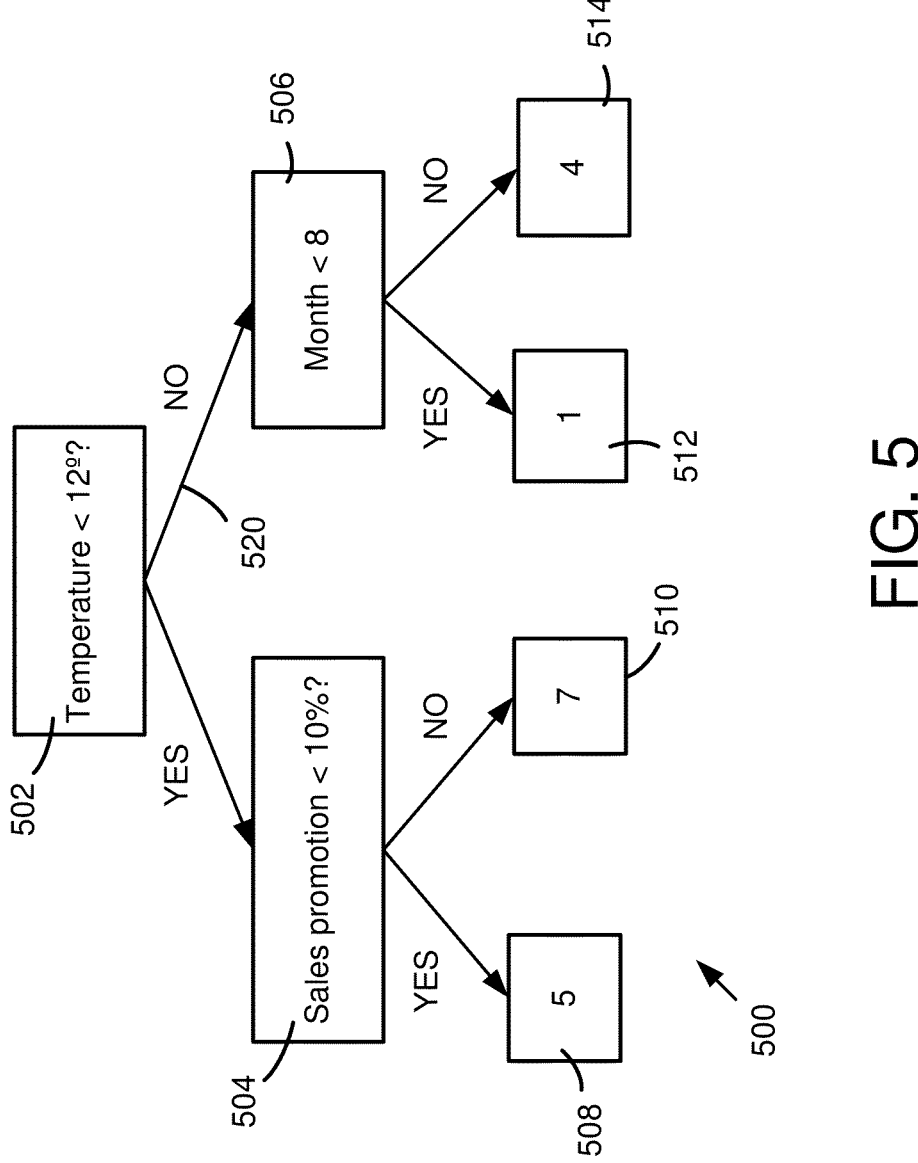
FIG. 5 depicts an example regression tree.

To illustrate, FIG. 5 shows a fully trained regression tree 500 for a fictitious example, predicting sales numbers for winter clothes based on attributes such as recent temperature (in degrees), sales promotion (in percentage of price), and current month (from 1 to 12). In this example, the regression tree 500 includes three inner nodes (502, 504, and 506) and four leaf nodes (508, 510, 512, and 514) that are arranged in three layers. The inner node 502 is located at a top layer and can also be referred to as a root node. Each inner node represents a test condition (e.g., Temperature <12° for inner node 502, etc.). The regression trees 500 also include edges 520 which connect selected nodes and represent decision paths based on evaluation of the test condition in each inner node).

During the inference phase, a given data sample, say (temperature=11°, sales promotion=15%, month=1), can traverse along the regression tree 500 from the top layer (root node 502) to the bottom layer (leaf nodes). The path in the regression tree and thus the final prediction depend on the sample's attribute values and the test conditions represented by the inner nodes. For the given sample, evaluation of the first test (i.e., "temperature <12°?") at the inner node 502 returns yes (because 11°<12°). Thus, the test follows the yes-path to the next inner node 504 and associated test condition (i.e., "sales promotion <10%?"). Evaluation of this test condition returns no (because 15%>10%). Thus, the prediction arrives at the leaf node 510 with a target value 7, which is the prediction result.

Example Generic Method for Training Regression Trees

FIG. 6 shows a pseudo-code implementation of an algorithm 600 (Algorithm 1) for training a regression tree. For simplicity, the algorithm 600 does not depict operations involved in FHE. A training algorithm 1200 incorporating FHE is depicted in FIG. 12 and described further below.

During the training phase, a tree structure can be built as formalized in Algorithm 1. The algorithm 600 can start with an empty tree without any nodes. Then, inner nodes are added until a stopping criterion is met (see, e.g., line 1 of Algorithm 1), for example, when a maximum depth or maximum number of layers of the regression tree is reached. When the stopping criterion is met, the leaf nodes can be determined. Average of target values assigned to each leaf node can be calculated (see, e.g., line 2 of Algorithm), which represents a predicted target value corresponding to that leaf node.

In the training phase, the data set of training samples S are used to find the best test condition which splits the set of training samples such that the resulting data subsets, L (denoting "left") and R (denoting "right"), contain "similar" target values (see, e.g., line 4-10 of Algorithm 1). Here, L contains training samples that satisfy the test condition and R is its complement. A split metric (also referred to as a "split score") can be calculated to measure the quality of a split, and further details of the split metric are described more fully below. The best test condition (also referred to as "best split") for an inner node is represented by a particular attribute and threshold combination, chosen among a plurality of possible attribute and threshold combinations, that minimize the split metric (see, e.g., line 7 of Algorithm 1). After selecting the best attribute-threshold pair, the same steps can be performed recursively on L and R, where the resulting subtrees are added as the left and right child nodes of the current inner node (see, e.g., lines 11-13 of Algorithm 1).

As described herein, training the regression tree includes recursively splitting the inner nodes into respective pairs of child nodes based on test conditions represented by the corresponding inner nodes until a stopping criterion is met (e.g., the stopping criterion specifies a maximum depth of the regression tree). The child nodes define the leaf nodes when the stopping criterion is met.

As described herein, training the regression tree includes generating a set of thresholds for each attribute. For example, for each selected attribute, a total of q thresholds (q>1) can be generated, each of which is tested for the selected attribute to determine a test condition represented by an inner node corresponding to the selected attribute, As described herein, recursively splitting the inner nodes into respective pairs of child nodes includes determining the test conditions represented by the inner nodes. As described above, a test condition represented by a selected inner node specifies a selected attribute and a selected threshold. The selected threshold is selected from one set of thresholds corresponding to the selected attribute. A training sample is assigned to left or right child node of the selected inner node based on comparison of the selected threshold with a sample value of the training sample corresponding to the selected attribute.

As described herein, determining the test condition represented by the selected inner node includes evaluating a split score based on a mean squared error (MSE) between target values of the training samples that are respectively assigned to left and right child nodes of the selected inner node and predicted target values, and choosing the selected attribute and the selected threshold, among a plurality of possible attribute and threshold combinations, that minimize the split score.

As described herein, training the regression tree further includes calculating averages of target values of the training samples assigned to the leaf nodes.

The goal of inference is to predict the target value of a new data sample. As described above with reference to the example of FIG. 5, a data sample without a target value traverses the regression tree from the root node to the leaf nodes. If the outcome of test condition represented by an inner node is true (resp., false), the data sample traverses down the left (resp., right) child node or subtree of the inner node. Finally, the prediction in the corresponding leaf node is output, and the prediction can be the average prediction over all trees in the forest.

Example Fully Homomorphic Encryption Schemes

Fully homomorphic encryption (FHE) allows performing computations on encrypted data (ciphertexts) that translates to computations on the underlying data (plaintext). A ciphertext can have a predefined size that determines the number of slots in the ciphertext for storing the encrypted data. Given ciphertexts $[\![ x_1 ]\!], \ldots, [\![ x_n ]\!]$ for plaintexts $x_1, \ldots, x_n$, FHE allows to apply a function $f$ on the ciphertexts without decrypting them. This results in a ciphertext decrypting $f(x_1, \ldots, x_n)$.

A FHE scheme includes the following components:

(pk, ek, sk)=Gen($\lambda$). The probabilistic key generation algorithm takes a security parameter $\lambda$ as input and generates a public key pk, an evaluation key ek, and a secret key sk.

$[\![ m ]\!]$ =Enc(pk, m). The probabilistic encryption algorithm takes a public key pk and a message m as input and returns the ciphertext $[\![ m ]\!]$ under k.

m'=Dec($[\![ m ]\!]$, sk). The deterministic decryption algorithm takes a ciphertext [m] and the secret key sk as input and returns the message $[\![ m ]\!]$ under pk.

$[\![ f(x_1, \ldots, x_n) ]\!]$ =Eval(ek, $f$, $[\![ x_1 ]\!], \ldots, [\![ x_n ]\!]$ ). The probabilistic evaluation algorithm takes an evaluation key ek, a function $f$, and ciphertexts $[\![ x_1 ]\!], \ldots, [\![ x_n ]\!]$ and returns encrypted function $[\![ f(x_1, \ldots, x_n) ]\!]$.

Instead of specifying an algorithm Eval that actually depends on $f$, the FHE schemes provide an algorithm add for addition and an algorithm mult for multiplication. This is sufficient since any efficiently computable function $f$ can be represented as an arithmetic circuit consisting of only addition and multiplication gates. Non-polynomial functions can be approximated as polynomial ones, e.g., via Taylor approximation.

Multiple FHE schemes exist. One example FHE scheme is CKKS which supports fixed-point numbers (i.e., numbers represented as fractions of integers) and ciphertext packing where multiple plaintexts can be packed into a single ciphertext. Ciphertext packing is also called batching and allows SIMD operations (i.e., single instruction on multiple data run simultaneously) where an evaluation is done in parallel for all the plaintexts encrypted in a ciphertext. For example, when adding two ciphertexts a=$[\![ a_1, \ldots, a_n ]\!]$ and b=$[\![ b_1, \ldots, b_n ]\!]$, the resulting ciphertext c=$[\![ a_1+b_1, \ldots, a_n+b_n ]\!]$ contains the addition of at and bi in the i-th slot. Another functionality related to batching is rotation (rot) which circularly rotates the slots in a ciphertext. As illustrated further below, rotation operation can be used to select specific values contained in slots of a packed ciphertext. The left rotation can be denoted by rot($[\![ x_1, \ldots, x_n ]\!]$, k)=$[\![ x_{k+1}, \ldots, x_n, x_1 \ldots, x_k ]\!]$, and the right rotation can be denoted by rot($[\![ x_1, \ldots, x_n ]\!]$, -k)=$[\![ x_{n-k+1}, \ldots, x_n, x_1 \ldots, x_{n-k} ]\!]$.

Example Noise Level Control in FHE

Noise is added to ciphertexts in FHE schemes as a natural consequence of performing operations on encrypted data (e.g., the probabilistic encryption algorithm can introduce an initial level of noise into the ciphertexts). Adding noise helps maintain the security of FHE by preventing information leakage from the ciphertext. When mathematical operations are performed on ciphertexts, the noise can accumulate in the ciphertext. The rate of increase is linear when addition operations are performed, and it grows exponentially during multiplication operations.

However, if the noise level becomes excessively high, it can interfere with the decryption process, rendering the ciphertext indecipherable. Thus, noise level control is needed to avoid such decryption failures.

In some examples, the noise level control can be achieved by maintaining a low circuit depth for the function $f$, e.g., by limiting the number of computational steps involved in the function $f$. In one specific example, the consecutive number of multiplication operations can be limited to not exceed a predefined threshold.

In some examples, bootstrapping can be employed to manage and reduce noise levels. For example, the noise level in the ciphertexts can be continuously monitored as the ciphertexts are modified by the homomorphic operations (e.g., additions and/or multiplications). Responsive to finding that the noise level exceeds a predetermined noise threshold, the noise level in the ciphertexts can be reset to a level below the predetermined noise threshold. In other words, bootstrapping can take a highly noisy ciphertext as input and generate a new ciphertext. This new ciphertext can carry the same original message but with a significantly reduced and fixed amount of noise.

The noise level control mechanisms described above, such as bootstrapping, can ensure that the message within the ciphertext remains secure and decipherable, regardless of the computations it undergoes.

As noted above, in traditional FHE-based model training, interaction between the client and server is necessary. The client sends training samples to the server, which performs computations on the encrypted data. However, these computations increase the noise level in the ciphertext, as explained above. At certain stages of computation, the noise level becomes so high that it prevents correct decryption of the results. To overcome this, the server sends intermediate results back to the client. The client then decrypts these results, performs local evaluations, re-encrypts the results, and sends them back to the server. This back-and-forth interaction between the server and client has been used to manage the noise level in the ciphertext during the FHE process.

However, the noise level control mechanisms described herein enable non-interactive FHE-based model training by managing and reducing noise levels directly on the server side, thereby removing the need for client-server interaction during training. For example, the bootstrapping allows for noise reduction in ciphertexts without requiring decryption. It takes a noisy ciphertext as input and outputs a new ciphertext of the same message but with a smaller, fixed amount of noise. In other words, when bootstrapping is applied during FHE-based model training, it ensures that the noise level in ciphertexts remains controlled throughout the computation process on the server side. This eliminates the need for intermediate decryption by the client and subsequent re-encryption and transmission of results back to the server.

Example Overview of Optimizations for FHE-Based Model Training

FHE is a powerful tool that allows computations on encrypted data, preserving privacy and security. However, the computational cost associated with FHE can be quite high, making it imperative to seek optimizations that can enhance efficiency and performance.

Several optimization strategies for the encrypted training algorithm are disclosed herein. One key optimization for FHE involves appropriate batching to capitalize on the parallelization of operations, specifically, Single Instruction Multiple Data (SIMD). Instead of performing operations on individual ciphertexts, batching involves grouping multiple plaintexts together into a single batch. These batches are then treated as a single unit for computations. By processing multiple data points at once, batching can reduce the computational overhead associated with performing operations on individual plaintexts, thus leading to significant performance improvements. A more detailed description of various batching options will be provided later.

An alternative expression for the split metric is introduced, which retains the same relative order as Mean Squared Error (MSE) but is more computationally efficient and avoids all but one square computation.

To identify the split with the best score, a method to find the 'argmin' (i.e., argument of the minimum, which is the input or argument of a function that yields the smallest output value) in a logarithmic number of steps is outlined. Techniques to reduce the number of divisions, or inversions, and ways to enhance the operation itself are also discussed.

The strategy of reusing results during training computation by leveraging symmetries in the tree structure is explained. An additional computation, known as pre-rotation, is performed that saves a logarithmic factor of computations later on, such as when marking samples as active.

These optimization steps will be elaborated on more fully in subsequent discussions.

Example Threshold Selections

As described above, training a regression tree involves determining test conditions represented by the inner nodes. For each inner node, the corresponding test condition is expressed in the form of comparing an attribute with a threshold corresponding to that attribute, where the threshold can be selected from a set of thresholds for that attribute.

To determine the best split threshold to split the training samples, one approach is to consider every value in each attribute as a potential threshold. Then, the best split threshold is selected, and the process can continue in a greedy fashion.

In an alternative approach, thresholds for each attribute can be determined based on using percentiles of the attribute domain (e.g., the thresholds can be selected to divide the range of the attribute into equal-sized segments) or randomly selected from all sample values corresponding to the attribute.

In implementation, a set of thresholds can be generated for each attribute (e.g., by calling a ThresholdGen function, see line 4 of Algorithm 4 in FIG. 12). In any case, the number of thresholds q (an integer that is greater than 1) for each attribute can be predefined.

Example Optimizations Using Batching Options

Figures 7A, 7B:
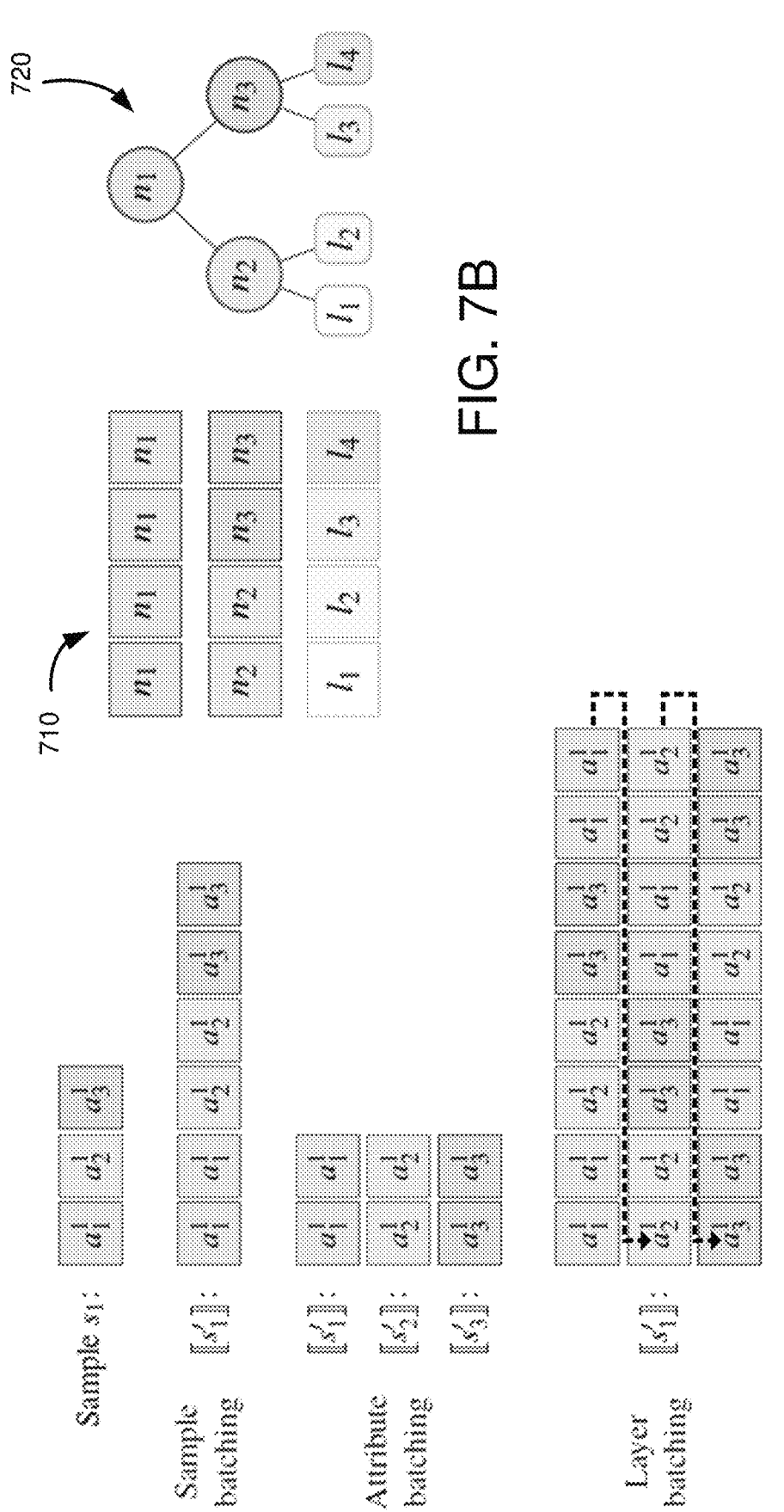
FIG. 7A illustrates three example batching results of a training sample using sample-wise batching, attribute-wise batching, and layer-wise batching, respectively.
FIG. 7B depicts duplication of nodes for layer-wise batching of FIG. 7A.

FIGS. 7A-7B schematically illustrate three batching options disclosed herein. In the depicted examples, q copies of attribute values are added to the batched samples (with q being 2 in the figures) facilitates the parallel testing of q thresholds at a later stage. In the depicted example, $$a_i^j$$

is the sample value corresponding to the i-th attribute in the j-th training sample, and target values are omitted for simplicity.

Batching can be performed either sample-wise or attribute-wise, as depicted in FIG. 7A. In this scenario, each sample or attribute corresponds to a single ciphertext. Another approach involves batching the samples according to the tree layers, as illustrated in FIG. 7B. In this case, all nodes of a layer are represented in one ciphertext, and duplicate samples are packed into a ciphertext based on the number of leaf nodes. Generally, a training data set can be visualized as a matrix of n training samples with m attributes, while the tree can be depicted as a matrix of grouped nodes. The use of multiple copies of attributes (or nodes) in a batch enables the simultaneous evaluation of multiple thresholds (or tree paths).

For attribute-wise batching, a ciphertext is assigned to each attribute. This involves packing values of the same attribute, albeit from different samples, into one ciphertext. In other words, n sample values from n training samples for each attribute are packed into one ciphertext. This approach eliminates the need for rotations during inference since every attribute-threshold combination, necessary for computing the optimal threshold, requires a distinct ciphertext. Moreover, the aggregation of slot-wise split evaluations of these combinations can be accomplished by summing over the different ciphertexts.

Certain considerations come into play with attribute-wise batching. For instance, a ciphertext is required for each attribute-threshold combination in every node. Additionally, the number of slots in a ciphertext can become a factor. If the number of samples exceeds the number of slots, it becomes necessary to extend the algorithm to accommodate multiple ciphertexts for a single attribute. However, for medium-sized datasets, such as those around 10k samples, ciphertexts with 16k or up to 32k slots are available, this consideration does not pose an issue.

Figure 8:
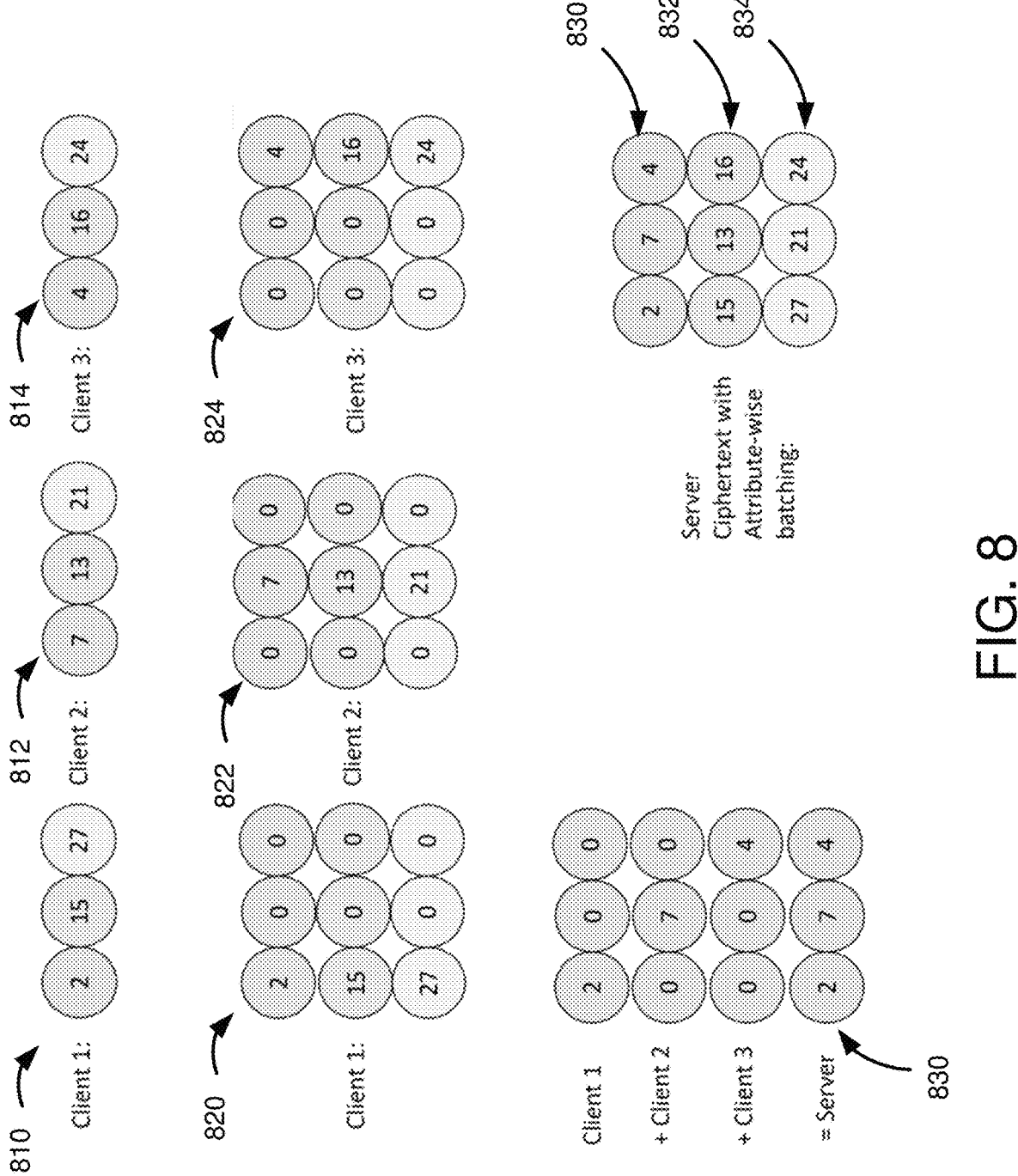
FIG. 8 illustrates an example implementation of attribute-wise batching.

Attribute-wise batching can handle multiple clients. Each client places her sample values at client-specific slots and sets the others to 0. For each attribute, all client ciphertexts are aggregated to obtain an attribute-wise batched ciphertext. As an example, FIG. 8 depicts attribute-wise batching for three training samples 810, 812, and 814 provided by three clients. In this example, each training sample has three sample values corresponding to three attributes (e.g., the training sample has three sample values 2, 15, and 27). Each training sample can be transposed and then padded with two columns of zeros. Thus, the training samples 810, 812, and 814 are transformed into matrices 820, 822, and 824, respectively. The server can then aggregate the sample values of all three clients for each attribute. For example, aggregation of sample values for the first attribute results in a vector 830 containing samples values 2, 7, and 4, which represent three sample values from all three clients, all corresponding to the first attribute. Similarly, aggregation of sample values for the second and third attributes result in vectors 832 and 834, respectively. Each of the vectors 830, 832, and 834 can thus be encrypted as a ciphertext containing sample values (corresponding to a specific attribute) of all training samples received from all clients.

For sample-wise batching, the sample values for each training sample are packed into a single ciphertext, that is, all attributes of the same training sample are packed together. To maximize the utilization of ciphertext slots, q copies of the sample value corresponding to each attribute are stored. Thus, if the training samples have m attributes, the sample-wise batching will pack m×q sample values for each training sample into one ciphertext. These duplicate copies of sample values can facilitate the parallel testing of multiple thresholds for an attribute. Given that the number of attributes m (for instance, less than 100) is typically significantly smaller than the number of slots in a ciphertext (e.g., approximately 16k), there are less concerns regarding the number of ciphertext slots. The value of q can be adjusted to match the number of thresholds to be tested. In other words, if each attribute has q thresholds, then duplication is performed so that each attribute has q sample copies. Sample-wise batching can be particularly beneficial in scenarios where multiple clients each holding one or more training samples and perform the batching locally.

The layer-wise batching bears similarity to sample-wise batching. Specifically, the layer-wise batching utilizes the sample-wise batching but concatenates multiple sample-wise packed vectors into a single ciphertext. Again, each sample-wise packed vector corresponds to a sample, and all attributes are duplicated (e.g., m copies) to facilitate parallel testing of multiple thresholds. Additionally, for layer-wise batching, all nodes of a layer are additionally represented in one ciphertext. Sample-wise packed vectors are duplicated to match the number of leaf nodes, and all copies are packed together in one ciphertext. This can be illustrated in FIG. 7B, which depicts an example tree 720 of depth 2 (i.e., inner nodes $n_1$, $n_2$, and $n_3$ are arranged in two layers) with 4 leaf nodes ($l_1$, $l_2$, $l_3$, and $l_4$). In this example, 4 copies of the sample-wise packed vectors are concatenated into one ciphertext. More generally, let h be the depth of the tree. For each node at layer i, where layer 0 is the root, $2^{h-i}$ copies of this node are packed, resulting in a (h+1)×$2^h$ matrix. Thus, an example tree of depth 2 (as the tree 720 of FIG. 7B) has 4 copies of the root node packed together (see, e.g., matrix 710) into one ciphertext and trained in parallel.

Behind each node $n_i$ stands the corresponding threshold and one-hot encoding. Although the following examples use thresholds, the one-hot encoding can be packed in the same way. Internally, all thresholds can be packed using sample-wise batching. Thus, for $n_1$, there is a threshold $$\tilde{t}_1 = (t_1^1, t_1^2, t_2^1, t_2^2, t_3^1, t_3^2)$$

with 2 thresholds for each of the 3 attributes. To get the corresponding threshold for the root layer, $\tilde{t}_1$ is concatenate 4 times to get the root threshold $\widetilde{t_{l0}} = (\tilde{t}_1, \tilde{t}_1, \tilde{t}_1, \tilde{t}_1)$. For the second layer, nodes $n_2$ and $n_3$ have corresponding thresholds $$\tilde{t}_2 = (t_1^1, t_1^2, t_2^1, t_2^2, t_3^1, t_3^2)$$

and $$\tilde{t}_3 = (t_1^1, t_1^2, t_2^1, t_2^2, t_3^1, t_3^2),$$

which are packed as shown in FIG. 7B to get the threshold for the second layer $\widetilde{t_{l1}} = (\tilde{t}_2, \tilde{t}_2, \tilde{t}_3, \tilde{t}_3)$. Thus, layer-wise batching enables parallel training of layers.

Like attribute-wise batching, the number of slots can be a factor to consider in layer-wise batch. The need arises to pack $mq2^h$ values into a single ciphertext. While m and q can be small, the factor $2^h$ may impose a constraint on the depth of a tree that can be supported. If the supported depth is surpassed, additional ciphertexts can be used to pack sample values per layer.

Generally, attribute-wise batching is faster when the number of training samples n is greater than or equal to the product of the number of attributes m and the number of thresholds q. In scenarios where this condition does not hold, layer-wise or sample-wise batching can be a more efficient approach. Additionally, when the tree height h is greater than or equal to 2, layer-wise batching can be faster than sample-wise batching. Thus, different batching options can be selected based on data sample size and/or the structure of the regression tree. For example, attribute-wise batching can be selected if n≥m×q. Otherwise, layer-wise batching can be selected if h>2 or sample-wise batching can be selected if h=1.

Example Optimizations for Split Metric Calculation and Comparison

In model training, the selection of the split metric typically exerts minimal influence on the model's accuracy. However, the choice of split metric can significantly impact the runtime, which is a key factor for optimization.

As described herein, the split metric can be based on Mean Squared Error (MSE). For example, for each candidate test condition (a candidate attribute-threshold combination) represented by an inner node, the MSE between target values of the training samples that are respectively assigned to left and right child nodes of the inner node and predicted target values can be evaluated. The best split (i.e., the attribute-threshold combination) can be chosen, among all possible possible attribute and threshold combinations, that minimize the MSE. However, calculating MSE directly involves many square operations, which can be computationally expensive.

Instead, disclosed herein is an alternative expression which diminishes the number of complex operations. A crucial observation is that determining the split with the smallest MSE does not necessitate the actual MSE values, but merely their relative order. Specifically, Let $L_t$ and $R_t$ be the set of samples to be considered in the left and right child nodes or subtrees (of an inner node) for a threshold t, respectively, and let $\bar{l}_t$ and $\bar{r}_t$ be their respective averages. Then, an MSE-based split score $\Sigma_{l \in L_t}(l-\bar{l})^2 + \Sigma_{r \in R_t}(r-r_t)^2$ has the same relative order as $$-\frac{1}{|L_t|}\left(\sum_{l \in L_t} l\right)^2 - \frac{1}{|R_t|}\left(\sum_{r \in R_t} r\right)^2 \tag{1}$$

Note that Eq. (1) is a computationally more efficient expression than MSE, as it only requires two square computations. Furthermore, the inverse operation can be done implicitly in 'argmin' as described below to reduce runtime and preserve accuracy.

Comparisons rare required to determine the best split (i.e., the attribute-threshold combination) that minimizes Eq. (1). When traversing the tree, the next node to visit is chosen based on the test condition that depends on the attribute and threshold. As described herein, a comparison function cmp (a,b) can be defined as follows:

$$cmp(a, b) := [a \leq b] := \begin{cases} 0 & \text{if } a \leq b \\ 1 & \text{else} \end{cases} \quad (2)$$

Example Optimizations for One-Hot Encoding of Smallest Split Metric

As described herein, an 'argmin' function can be implemented to yield a one-hot encoding $t_{OH}$ of threshold t, corresponding to the smallest split score. An FHE-friendly representation of the split score, devoid of division, is described below. Additionally, a helper function, denoted as 'mincopy' is introduced to facilitate the realization of 'argmin'.

First, the split score is expressed as a numerator and denominator to enhance their comparison efficiency. Specifically, the split score of threshold t is represented with numerator $P_t$ and denominator $Q_t$ as follows:

$$\frac{P_t}{Q_t} = \frac{-|R_t|\left(\sum_{l \in L_t} l\right)^2 - |L_t|\left(\sum_{r \in R_t} r\right)^2}{|L_t||R_t|} \quad (3)$$

Instead of directly computing $$\frac{P_t}{Q_t} \leq \frac{P_s}{Q_s}$$

to compare thresholds t and s (which requires calculating the inverse), the comparison of ratios can be transformed by applying the equivalent comparison of products:

$$\frac{P_t}{Q_t} \leq \frac{P_s}{Q_s} \Leftrightarrow P_t \times Q_s \leq P_s \times Q_t \quad (4)$$

Note that computing a multiplication is more efficient than computing (a polynomial approximation of) an inverse and is more accurate (as it avoids approximation errors for the inverse).

As described herein, the optimization scheme can leverage the parallel evaluation of multiple thresholds and rotations. To implement the 'argmin' function, a rotation-based helper function, termed 'mincopy', can be implemented. Specifically, given a vector, 'mincopy' identifies the minimum value and replicates it across all slots of the resulting vector. With |T| thresholds packed for each attribute (denote |A| the number of attributes), the rotation-based 'mincopy' necessitates only a logarithmic number of comparisons, i.e., $O(\log(|A| \cdot |T|))$, as opposed to $O(|A| \cdot |T|)$.

FIG. 9A shows a pseudo-code implementation of the 'mincopy' algorithm 900 (Algorithm 2). An example illustrating step-by-step operations of the 'mincopy' function is shown in FIG. 9B. In the depicted example, v is a vector of 8 elements, v' denotes a rotation of the vector v, and v" denotes slot-wise (or element-wise) determination of the minimum value between vectors v and v', i.e., min(v, v')). As shown, the minimum value in vector v is 1 located in the third slot. After three rotation operations, the minimum value 1 is expanded to all slots of the vector.

Thus, if the split scores for a plurality of thresholds are arranged in a score vector, the 'mincopy' function can identify the smallest split score and convert the score vector into a minimum score vector in which all elements equal to the smallest split score, by iteratively performing element-wise comparison between the score vector and a rotated version of the score vector and updating the score vector based on the element-wise comparison.

With 'mincopy' established, a final step is required to implement 'argmin', with its output encoded as a one-hot vector which identifies a threshold in the threshold vector that is associated with the smallest split score. This involves an element-wise comparison of the input and output of 'mincopy'. For instance, when performing element-wise comparison between the minimum score vector x" and the original score vector v as depicted in FIG. 9B, the resulting one-hot vector is determined to be (0, 0, 1, 0, 0, 0, 0, 0). This indicates that the minimum value resides in the third slot.

Example Optimizations for Inverse Calculations

In the computation of MSE and 'argmin', alternative expressions are used that circumvent inversion, that is, the calculation of 1/x given x (see, e.g., formula (4)). Despite this, the inverse is still required for computing each leaf's prediction, as it represents the average target value from samples placed in or assigned to a leaf. Note that all samples are considered at each node to prevent information leakage, thus the number of samples per node is concealed. Nonetheless, it remains necessary to identify which samples are active per node, meaning they satisfy all test conditions along the path from the tree root to a given node. To monitor a sample's active status, a bit vector W (also referred to as "activeness indicator" or "weight vector") can be computed to indicate whether a sample is active (1) or not (0).

With the activeness indicator Wand the set of target values Z, the prediction (i.e., the predicted target value) for a leaf node can be computed. Initially, the sum of active target values can be calculated as $$s = \sum_{i=1}^{|Z|} (Z_i \times W_i),$$

which is essentially the dot product of vectors Z and W. Subsequently, the number of active samples can be computed as $$a = \sum_{i=1}^{|W|} W_i.$$

The prediction for the leaf node is then given by the average, calculated as $s \cdot 1/a$.

In some examples, Goldschmidt's iterative approach can be used to approximate the inversion 1/a. Note that to use Goldschmid's method, the input a must fall within the range [0,2]. Thus, rescaling might be necessary prior to calculating the inverse 1/a. Conveniently, rescaling can be applied and reversed by multiplying with the same constant c before and after the inverse operation, as $1/a = c \cdot 1/(a \cdot c)$.

Since the path a training sample takes in a tree is hidden to prevent information leakage, a training sample must traverse all paths in a tree. The outcome of each path can be multiplied by a bit that indicates whether this is the correct path for the training sample. Consequently, all but one result will be zero, and their summation yields the prediction of the sample's actual path. While it's generally true that $$\frac{P_1}{Q_1} + \frac{P_2}{Q_2} = \frac{P_1 + P_2}{Q_1 + Q_2}$$

usually does not hold true and the correct expression should be $$\frac{P_1}{Q_1} + \frac{P_2}{Q_2} = \frac{P_1 \times Q_2 + P_2 \times Q_1}{Q_1 \times Q_2},$$

the former can still be used in this context. This is because a sample only arrives in one leaf node, rendering all other numerators and denominators zero. Thus, either $P_1$ and $Q_1$ or $P_2$ and $Q_2$ are zero, and after the addition, only the non-zero part remains.

Example Optimizations Using Symmetries

The structure of a complete regression tree embodies symmetries, evident in the disjoint splitting of training samples towards child nodes. These symmetries offer opportunities for computational savings. For instance, given less= $[a \leq t]$, greater=$[a > t]$ can also be expressed as greater=1−less. This expression can switch a costly comparison for a cheaper subtraction operation, while maintaining the same accuracy. Instances of such symmetries can be found in lines 6, 8, and 22 of Algorithm 4 shown in FIG. 12.

Symmetries also arise during the computation of $|L_t|$, $|R_t|$ (lines 5 and 6 of Algorithm 4), $\Sigma_{x \in L_t} x$, $\Sigma_{x \in R_t} x$ (lines 7 and 8 of Algorithm 4), and $$W_i^L, W_i^R$$

(lines 21 and 22 of Algorithm 4). In this case, total sums $|L_t \cup R_t|$ and $\Sigma_{x \in (L_t \cup R_t)} x$ can be computed beforehand. The computation of $|R_t|$ is then simplified to $|L_t \cup R_t| - |L_t|$, and similarly for $\Sigma_{x \in R_t} x = \Sigma_{x \in (L_t \cup R_t)} x - \Sigma_{x \in L_t} x$. This computation can be performed in the parent node. Thus, the left and right child nodes do not need to compute their respective set sizes independently but can pre-calculate them in the parent node. The parent node can leverage the aforementioned symmetries to further reduce runtime.

Example Optimizations Using Pre-Rotations

As described herein, a pre-rotation technique, which involves performing some rotations in advance, can be used in FHE training of a regression tree. The pre-rotation technique can reduce the overall number of rotations during training.

In the computation process, there's a need to expand a one-hot vector, where 1 is set for a single threshold value within an attribute boundary (as described above), to a vector containing ones for the entire attribute (i.e., all q thresholds for this attribute). This expanded vector indicates which samples are active for a given path in the regression tree (e.g., placed in left or right child for a given node). Pre-rotation can save $n\log(q)$ rotations during this expansion.

Let's consider a sample $s_1 = (a_1, a_2, a_3)$ and a vector $$t = (t_1^1, t_1^2, t_2^1, t_2^2, t_3^1, t_3^2)$$

containing possible threshold values per attribute. The sample and threshold are packed (using sample-wise batching) as $$[\![s_1]\!] = [\![a_1^1, a_1^1, a_2^1, a_2^2, a_3^1, a_3^2]\!] \text{ and } [\![t]\!] = [\![t_1^1, t_1^2, t_2^1, t_2^2, t_3^1, t_3^2]\!],$$

respectively. Then, for each sample, the vector of comparison bits $[\![c_1]\!] = [\![s_1 \leq t]\!]$ is computed.

As described above, the computation of 'argmin' can return a one-hot vector of $o_1 [\![ = 0, 0, 1, 0, \ldots, 0 ]\!]$. Here, a 1 in $o_1$ means that the threshold at that position leads to the best split. To decide which path sample $s_1$ takes in the tree, the product $c_1 \cdot o_1$ of can be computed. A sample that goes to the left must have an attribute value that is less than or equal to the selected threshold, i.e., $c_1$ must have a 1 at that position as well. The goal is to use the vector $c_1 \cdot o_1$ to indicate which samples go to the left and right child. This can be achieved by multiplying $c_1 \cdot o_1$ and its complement $(1 - c_1) \cdot o_1$ of with all samples. However, since $c_1 \cdot o_1$ is also one-hot encoded and does not select all attribute values in a sample, it needs to be either a vector of all ones or all zeros (to avoid losing the other attribute values in $s_1$). To ensure this, the desired slot is expanded to all other slots in the vector. The technique is the same as the one used to calculate 'argmin' function described above, but instead of comparing, the rotated vector is simply added to a non-rotated copy. In this way, a total of $\log(m \cdot q)$ rotations are needed to expand the result for every sample. The concept of pre-rotation hinges on the potential to conserve rotations. Given that a sample already encompasses multiple copies of each attribute, it allows for the execution of multiple comparisons in parallel. This is feasible if both the threshold $[\![t]\!]$ and the one-hot vector include multiple copies of the attribute of interest, aligning with the slots in $[\![s_1]\!]$.

Generally, let q and n be integers such that q divides n. Let $i_{OH}$ be a one-hot vector of dimension n. Then a pre-rotation algorithm can be configured to take $i_{OH}$ and q as input and output a vector $x = (x_1, \ldots, x_n)$ using $2 \log(q)$ rotations such that $$x_j = \begin{cases} 1 & \text{if } j \in \left[ \left\lfloor \dfrac{i}{q} \right\rfloor \cdot q + 1, \left\lfloor \dfrac{i}{q} \right\rfloor \cdot q + q \right] \\ 0 & \text{else} \end{cases}$$

FIG. 10A shows a pseudo-code implementation of a 'Prerotate' function, which implements a pre-rotation algorithm 1000 (Algorithm 3). The 'Prerotate' function takes a ciphertext with only one non-zero element and expands it to all the slots belonging to the same attribute. An example illustrating step-by-step operations of the 'Prerotate' function is shown in FIG. 10B. In the depicted example, the input vector x has 8 elements corresponding two attributes: the first 4 elements correspond to a first attribute and the last 4 elements correspond to a second attribute. Only the 7th element in vector x is 1, whereas the remaining elements are zeros. As shown, after pre-rotation operations, ones are expanded to all 4 slots of the vector corresponding to the second attribute.

The expansion of 'Prerotate' can be applied to both one-hot vector of and a modified threshold $t \cdot o_1$. As the position of 1 in the encrypted vector $o_1$ is unknown, the algorithm first expands every element q slots to the left (lines 1-2 of Algorithm 3). This initial expansion ensures that the non-zero value is at the first slot corresponding to the attribute. Given that the non-zero value is at the first slot, a mask can be applied to the resulting ciphertext. This mask contains 1 for every first slot of an attribute and 0 otherwise (line 4 of Algorithm 3, see also mask in FIG. 10B). By applying the mask, the desired value can be obtained in the first slot of the corresponding attribute. The pre-rotation process is completed by expanding the first attribute slot to the right until all slots corresponding to this attribute contain the desired value (lines 6-7 of Algorithm 3). Each of the two expansion steps in Algorithm 3 (lines 1-2 and 6-7 of Algorithm 3) requires log(t) rotations. Additional rotations amounting to 4 log(q) per node are needed since both the one-hot encoding and threshold require pre-rotation. However, when traversing samples through a node and calculating splits, q comparisons are computed in parallel, reducing rotations per sample to log(m) instead of log(q·m).

Figure 11:
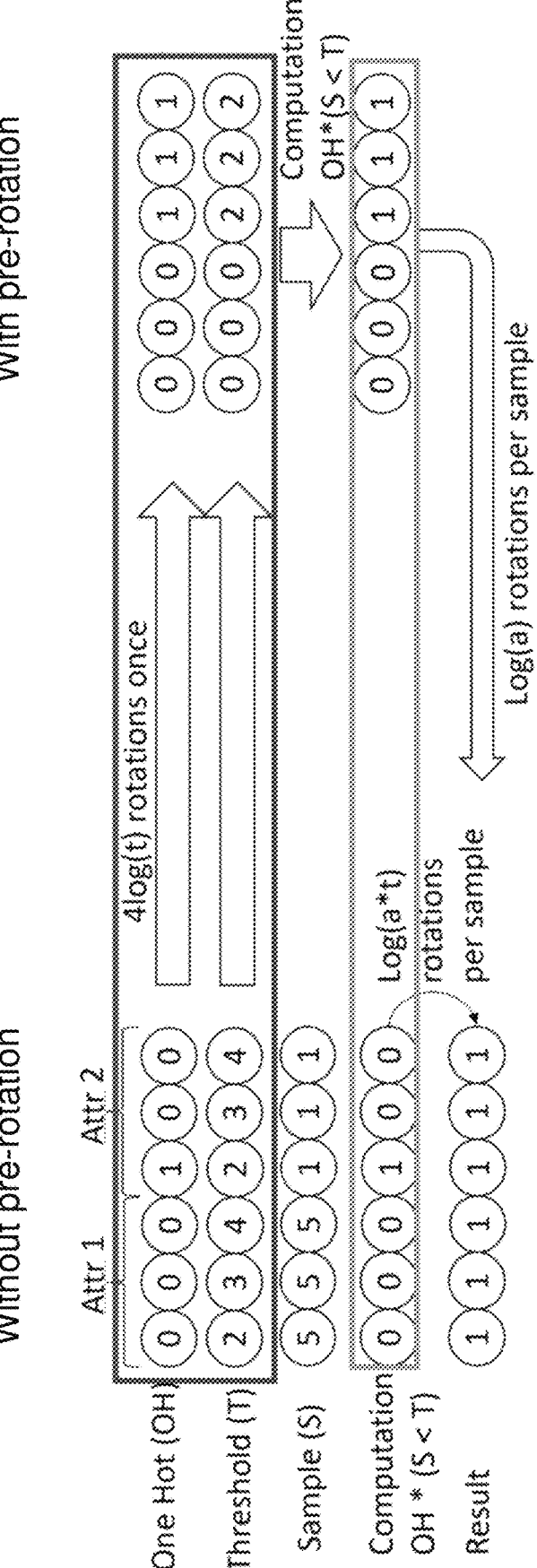
FIG. 11 is another use case illustrating efficiency gain of using the prerotate algorithm of FIG. 10A.

The saving of rotations can be further illustrated in an example depicted in FIG. 11. This example shows a one-hot vector (OH): [0, 0, 0, 1, 0, 0]. Here, the first three slots of OH correspond to the first attribute and the last three slots correspond to the second attribute. Only slot 4 has value 1 while others are zeros. Also shown are a threshold vector (T) containing six threshold values [2, 3, 4, 2, 3, 4] (i.e., the first three thresholds are tested against the first attribute, and the last three thresholds are tested against the second attribute), and a sample (S) containing six sample values [5, 5, 5, 1, 1, 1] (i.e., three copies of sample value 5 correspond to the first attribute and three copies of sample value 1 correspond to the second attribute).

Without pre-rotation, evaluation of (S<T) (i.e., elementwise comparison between S and T) will yield 1 at the 4th slot and zeros for all other slots. Thus, the computation of OH·(S<T) would lead to a new vector [0, 0, 0, 1, 0, 0]. As described above, to expand 1 to all slots, log(a·t) rotations per sample are needed. Assuming the total number of samples is n, the total number of rotations needed would be n·log(t)+n·log(a). In contrast, with pre-rotation (which requires only 4·log(t) rotations once), the one-hot vector (OH) can be converted to [0, 0, 0, 1, 1, 1] and the threshold vector (T) can be converted to [0, 0, 0, 2, 2, 2]. The computation of OH·(S<T) would lead to a new vector [0, 0, 0, 1, 1, 1], which can be further expanded to a vector of all ones (i.e., [1, 1, 1, 1, 1, 1]) by performing log(a) rotations per sample. The total number of rotations needed would be 4·log(t)+n·log(a). Thus, by performing pre-rotation, the total number or rotations needed will be reduced if n>4.

Example FHE-based Secure Training Algorithm

FIG. 12 is a pseudo-code implementation of a secure training algorithm 1200 (Algorithm 4) for training a regression tree. The overall structure and flow of the secure training algorithm 1200 is similar to the algorithm 600 (Algorithm 1) of FIG. 6. But unlike the algorithm 600, the secure training algorithm 1200 incorporates FHE so that the training encrypts the regression tree through homomorphic operations on ciphertexts. Additionally, several optimization schemes described above are used to improve the computation efficiency of the training.

Before getting into details of the algorithm 1200, some preliminary considerations are important to facilitate understanding of the algorithm. Firstly, some additional notation is introduced. Each attribute a is associated with a set $T_a$ of thresholds, where the cardinality of $T_a$ equals q (i.e., $|T_a|=q$) for all attributes. The superscripts L and R are used to indicate whether a sample corresponds to the left or right child node of an inner node, respectively. The position of a ciphertext in an array of ciphertexts is denoted by subscripts (note that this does not indicate slots within a ciphertext). To index a slot in a ciphertext, all the slots are first listed as ct=($s_1$, . . . , $s_n$) and the value of a single slot is referred to with si.

Rescaling of Values. As described above, the FHE scheme typically involves homomorphic operations like addition and multiplication, but not comparison. Thus, the test condition cannot be directly calculated in FHE due to the non-polynomial nature of comparison. Instead, an approximation, which is elaborated above (see Eq. (2)), is utilized as a replacement. When the predicted values in the leaves are calculated, an average of all target values is taken, necessitating the division of the sum of the target values by the number of target values. The inverse function, also being non-polynomial, requires an approximation (e.g., Goldschmidt's iterative approach) which is discussed above. Since approximations yield good results only within a set interval, it is ensured that the input values fall within this interval. For comparison, the values must lie within [0, 1] and for the inverse within [0, 2]. Consequently, the samples must also reside within an arbitrary but fixed interval [a, b] to facilitate necessary rescaling. A linear transfer function $f(x)=(x-a)/(b-a)$ can be used to map the interval [a, b] to [0, 1]. As a and b are known beforehand, rescaling can be performed by the client prior to sending training samples to the server, thereby saving runtime and accuracy.

Leakage Prevention. No information about the data (including the similarity of samples) should be leaked during the training process. All samples are made to traverse all paths of the regression tree during both training and prediction. An encrypted bit for each sample in every path is maintained to track the correct path of a sample, indicating whether a sample is in the path or not. When working with the data in a node of the regression tree, all the samples are multiplied with their corresponding bits before continuing with the training procedure. Since the optimal structure of a regression tree is an NP-hard (nondeterministic polynomial time) problem, and the number of active samples in a node is unknown, no advantage can be taken of any kind of early stopping without decryption. Therefore, only complete trees are trained. Another value that is prevented from being leaked is the threshold and the chosen attribute in each inner node. Not only is the actual threshold tracked, but also all tested thresholds, with the correct one indicated by a one-hot encoding. During training and prediction, a multiplication of the one-hot encoding and the thresholds is performed, similar to the samples, and the result is summed together to obtain the actual threshold needed for the test condition.

Choosing Rotation-optimal Parameters. To aggregate the values packed in a ciphertext, rotation can be utilized. For instance, to add all the values in a ciphertext with a size s (the number of slots in the ciphertext), only log(s) many additions and rotations are needed by rotating the ciphertext with an increasing power of two. This approach assumes that s is a power of two. While an arbitrary number of slots can be dealt with to still obtain the correct result, this would lead to a more complex computation. Therefore, it is assumed that the number of samples n, the number of attributes m, and the number of thresholds q are all a power of two since aggregation along these axes is required in different batching approaches. The number of thresholds q can be set by the server, ensuring that this requirement is fulfilled. Regarding m, dummy values can be inserted to make it a power of two. These dummy values do not alter the resulting tree structure because they are all identical and a split along these values does not result in an information gain, due to all samples taking the same path, so another attribute is always chosen by the tree for the split. If n violates this condition, dummy samples can also be added. To ensure a correct tree in this case, the bit indicating if a sample is active in a node is set to 0 for the root. Thus, the sample is set to inactive in the root and will not be considered when performing computations.

Referring to FIG. 12, which summarizes the secure training algorithm 1200. It should be noted that plaintext operations depicted in FIG. 12 are used for better readability, but all operations are executed on ciphertexts. These ciphertexts are packed according to the batching approach, as discussed above, to utilize the SIMD operations. The structure of the algorithm remains unchanged for sample-wise, attribute-wise, and layer-wise batching, with only rotation and packing details varying. It should also be noted that the control flow, i.e., the result of the if-condition (e.g., lines 1 and 14) in Algorithm 4, cannot be revealed as this would leak additional information. Therefore, the logical operation $x=$(if $c \leq d$ then a else b) is treated as the following computation: $x=a\times(c \leq d)+b\times(c>d)$.

The algorithm 1200 is described using sample-wise batching, with other batching options being similar. The inputs include a set of sample vectors S, a set of target vectors Z, and a set of weight vectors W for representing the activeness (1 or 0) of each sample, initially set to 1 for all samples. Note that S, Z, and W are all encrypted in ciphertexts. The size of S (i.e., the number of samples in S) is denoted as n, i.e., |S|=n. The set of sample attributes is denoted as A, and each sample has |A| attributes. Each vector in S is a sample batched sample-wise as explained above. Each vector in Z includes duplicates of the corresponding target value, and each vector in W initially includes duplicates of 1.

Using the encrypted inputs, the recursive algorithm 1200 is run by the server. In each iteration, it is checked if a stop criterion is satisfied, e.g., if the maximum depth has been reached (line 1 of Algorithm 4) and a leaf node with an average of the targets of samples active at that node is returned (line 2 of Algorithm 4). Otherwise, the threshold vector T is generated (line 4 of Algorithm 4), as described above.

The MSE-based split metric can then be evaluated for selecting the 'argmin' over all ciphertext slots. As described above, evaluation of the MSE-based split metric involves calculating the counts of samples assigned to left and right subtrees of an inner node (denoted as $cnt^L$ and $cnt^R$, representing $|L_t|$ and $|R_t|$, respectively; lines 5-6 of Algorithm 4), sum of target values assigned to left and right subtrees of the inner node (denoted as $targ^L$ and $targ^R$, representing $\Sigma_{l \in L_t}$ l and $\Sigma_{r \in R_t}$ r, respectively; lines 7-8 of Algorithm 4), and computation of $P_t$ and $Q_t$ (denoted as $num_{orig}$,num and $denom_{orig}$,denom, respectively; lines 9-10 of Algorithm 4). Instead of comparing ratios $$\left(e.g., \frac{P_t}{Q_t} \leq \frac{P_s}{Q_s}\right),$$

the split metric is evaluated based on comparing products (e.g., $P_t \times Q_s \leq P_s \times Q_t$) as illustrated in formular (4) (line 14 of Algorithm 4). As described above, the 'mincopy' algorithm can be used to identify the smallest split metric (lines 11-17 of Algorithm 4). The 'argmin' is represented by a one-hot vector (line 18 of Algorithm 4).

Then, both the one-hot 'argmin' vector and the threshold vector T are pre-rotated (line 19 of Algorithm 4) to efficiently split the samples, i.e., computing samples that traverse left (resp. right). The weight vectors W can be split into two subsets $W^L$ and $W^R$, respectively representing activeness (1 or 0) of samples assigned to the left and right subtrees of the inner node (lines 20-23 of Algorithm 4). The one-hot vector and the threshold vector determined for the inner node can be saved (line 24 of Algorithm 4). Then, the algorithm 1200 can recursively train the left and right subtrees of the inner node (lines 25-26 of Algorithm 4) until the stop criterion is met (line 1 of Algorithm 4).

Example Use Case Illustrating Steps of FHE-Based Secure Training Algorithm

To provide further illustration, FIGS. 13-16 demonstrate a use case with a simplified example, guiding through the steps of the secure training algorithm 1200.

Figure 13:
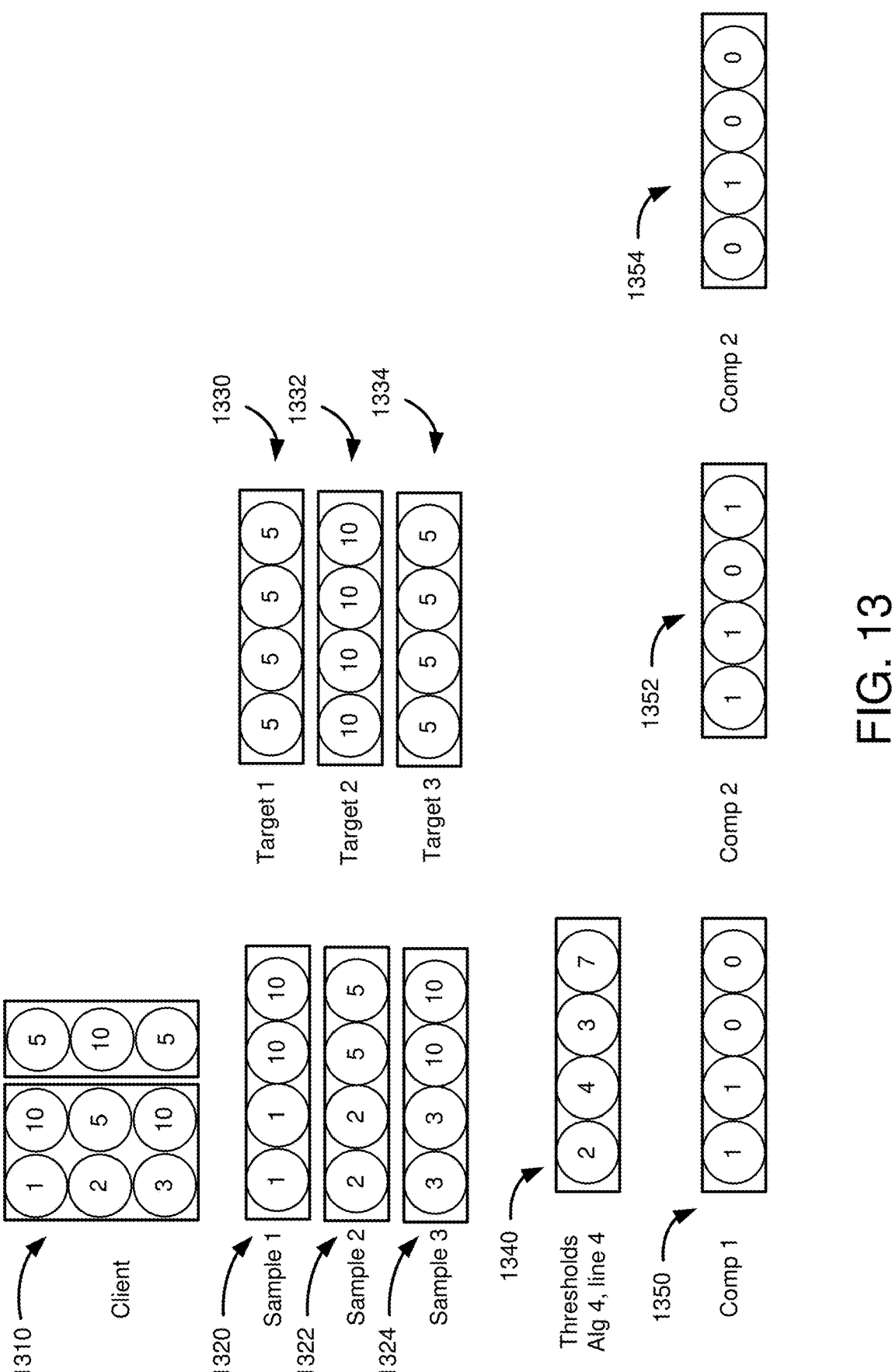
FIG. 13 depicts results of performing steps of the fully homomorphic encryption training algorithm of FIG. 12, according to one example use case.

FIG. 13 shows training samples 1310 provided by a client (e.g., a data owner 120). In this simplified example, there are three training samples (arranged in three rows, i.e., n=3), and each training sample has sample values corresponding to two attributes (arranged in the first two columns, i.e., |A|=2) and an associated target value (arranged in the third column). For example, the first training sample has two sample values 1 and 10 and a target value 5, the second training sample has two sample values 2 and 5 and a target value 10, and the third training sample has two sample values 3 and 10 and a target value 5.

Using sample-wise batching, the three training samples 1310 are duplicated and then packed sample-wise to generate three ciphertexts, also referred to as sample vectors (e.g., sample vectors 1320, 1322, and 1324), which contain duplicated sample values. Meanwhile, the target value in each training sample is also duplicated and packed into a ciphertext, also referred to as a target vector (e.g., target vectors 1330, 1332, and 1334), which has the same length as the corresponding ciphertext. In this simplified example, the number of thresholds for each attribute is set to two, i.e., q=2. Thus, after the batching operation, each attribute has two copies of the corresponding sample value in the corresponding sample vector. Also, each target vector contains four copies of a corresponding target value.

The sample vectors 1320, 1322, and 1324 (collectively define S) and the target vectors 1330, 1332, and 1334 (collectively define Z) are provided as input (along with the all-ones weight vector W) to the secure training algorithm 1200.

FIG. 13 shows an example threshold vector 1340 generated by the algorithm 1200 (line 4 of Algorithm 4). In this example, two thresholds (as q=2) are generated for each attribute. For example, thresholds 2 and 4 are generated for the first attribute, and thresholds 3 and 7 are generated for the second attribute.

Each sample vector is compared with the threshold vector 1340 (see the comparison $(S_i<T)$ in lines 5 and 7 of Algorithm 4). The results of the comparison are three comparison vectors 1350, 1352, and 1354, corresponding to the three sample vectors 1320, 1322, and 1324, respectively. For example, the comparison vector 1350 is [1, 1, 0, 0], indicating the first two sample values (1, 1) of the first sample vector 1320 are less than or equal to the corresponding thresholds (2, 4) of the threshold vector 1340, whereas the last two sample values (10, 10) of the first sample vector 1320 are larger than the corresponding thresholds (3, 7) of the threshold vector 1340.

Figure 14:
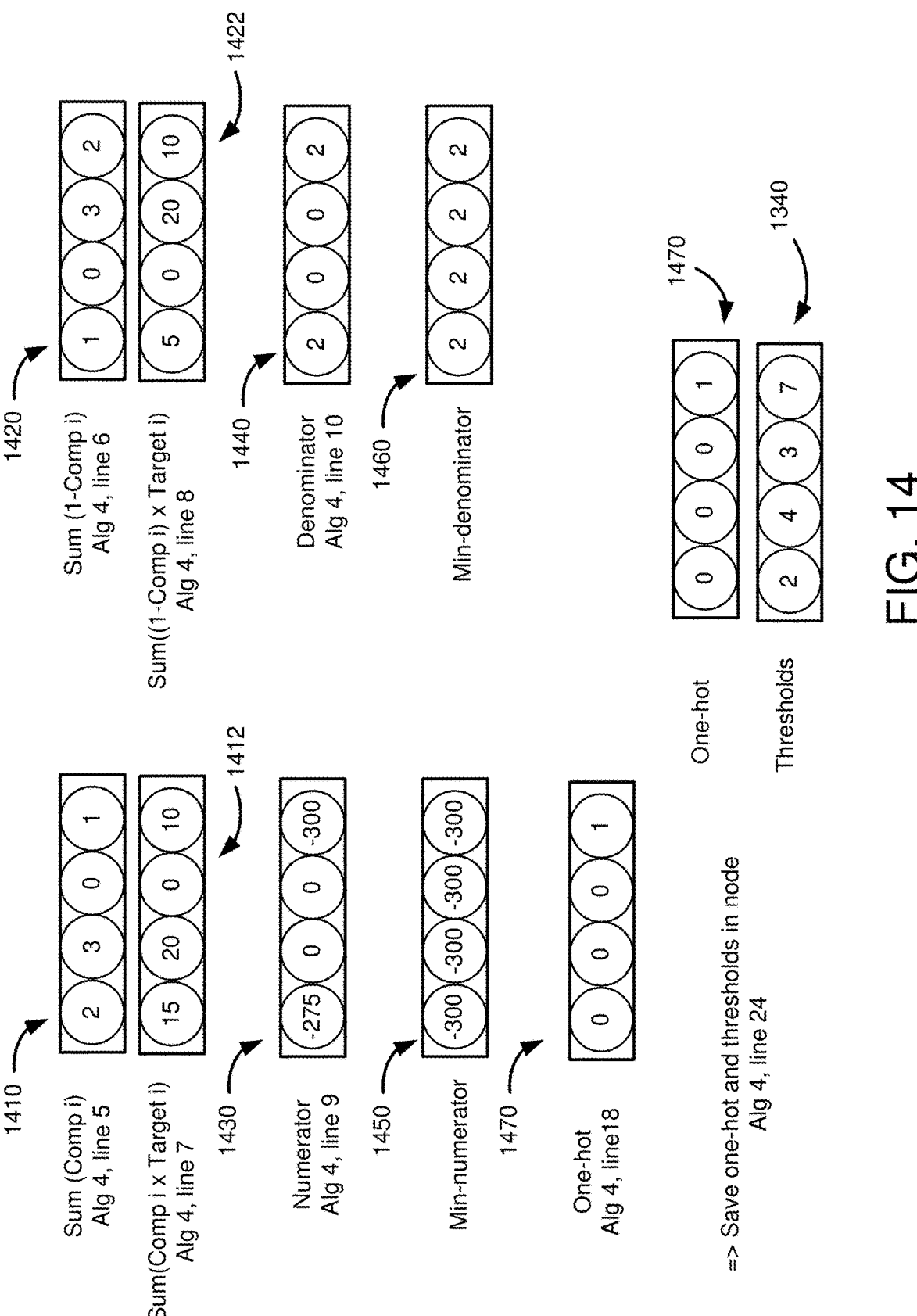
FIG. 14 depicts results of performing additional steps (following the steps of FIG. 13) of the fully homomorphic encryption training algorithm of FIG. 12.

FIG. 14 shows intermediate results of additional steps of running the algorithm 1200. For example, computing $|L_t|$ or $cnt^L$ (line 5 of Algorithm 4) results in a left count vector 1410, computing $|R_t|$ or $cnt^R$ (line 6 of Algorithm 4) results in a right count vector 1420, computing $targ^L$ or $\Sigma_{l \in L_t}$ l (line 7 of Algorithm 4) results in a left sum vector 1412, and computing $targ^R$ or $\sum_{r \in R_t} r$ (line 8 of Algorithm 4) results in a right sum vector 1422. Here, the vector 1410 is obtained by summing the three comparison vectors 1350, 1352, and 1354. The vector 1420 can be derived from the vector 1410 using symmetry, as described above. The vector 1412 is obtained as the sum of element-wise products (also known as Hadamard product or Schur product) between three comparison vectors 1350, 1352, 1354 and three corresponding target vectors 1350, 1352, 1354. The vector 1422 can be derived from the vector 1412 using symmetry, as described above.

Then, a numerator vector 1430 and a denominator vector 1440 can be calculated. The numerator vector 1430 is the inverse of the sum of two components: (1) the element-wise product between the left count vector 1410 and the squared right sum vector 1422, and (2) the element-wise product between the right count vector 1420 and the squared left sum vector 1412 (line 9 of Algorithm 4). Here, a squared vector refers to the element-wise product of the vector with itself. The denominator vector 1440 is the element-wise product of the left count vector 1410 and the right count vector 1420 (line 10 of Algorithm 4).

By performing the 'mincopy' function (lines 11-17 of Algorithm 4, see also the 'mincopy' algorithm 900 of FIG. 9A), the minimum numerical value in the numerator vector 1430 (e.g., −300 in slot 4) is identified and expanded to all slots, resulting in a min-numerator vector 1450. A denominator value in the denominator vector 1440 corresponding to the minimum numerical value (e.g., 2 in slot 4) is also expanded to all slots, resulting in a min-denominator vector 1460.

Then, a one-hot vector 1470 can be generated (line 18 of Algorithm 4), which identifies the index or slot number (e.g., the slot 4 in the depicted example) of the minimum numerical value in the numerator vector 1430. The one-hot vector is computed by comparing the numerical vector 1430 and denominator vector 1440 with the min-numerator vector 1450 and min-denominator vector 1460. For example, for the first slot, −275/2>−300/2, thus, the first slot in the one-hot vector is zero. Note that the above comparison of ratios (numerator over denominator) can be converted to comparison of products (line 14 of Algorithm 4). The resulting one-hot vector 1470 and the threshold vector 1340 can then be saved in a node (line 24 of Algorithm 4) of the regression tree. The one-hot vector 1470 and the threshold vector 1340 specify a test condition represented by this node (i.e., an attribute-threshold combination that results in the smallest MSE). In the depicted example, the test condition represented by this node is a comparison of the second attribute (as both slots 3 and 4 correspond to the second attribute) with the threshold value 7.

Figure 15:
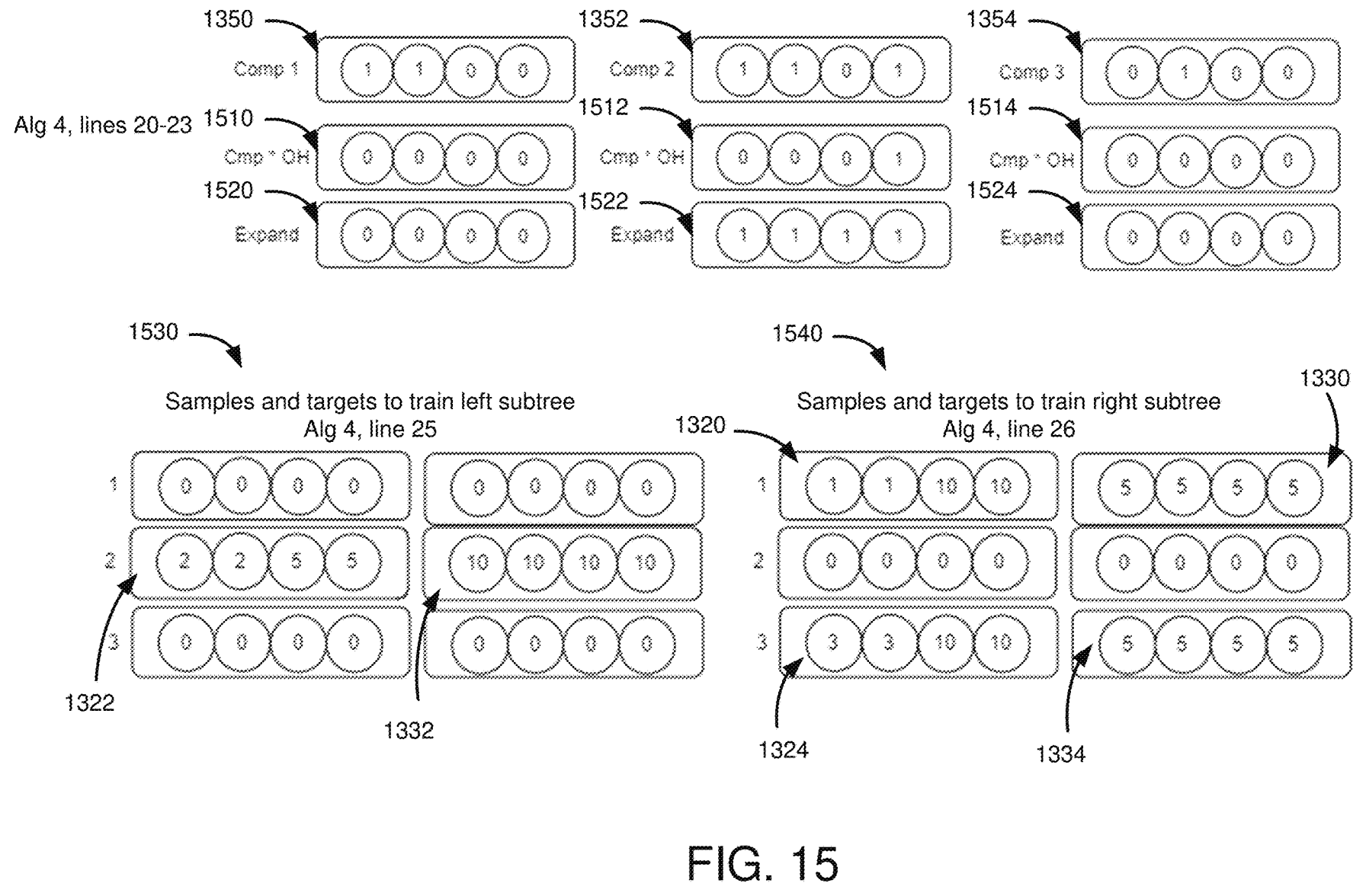

Referring to FIG. 15, which again lists the three comparison vectors 1350, 1352, and 1354. FIG. 15 also shows three weight vectors 1510, 1512, and 1514, which are respectively calculated as element-wise products of the one-hot vector 1470 and the three comparison vectors 1350, 1352, and 1354 (i.e., OH×(S≤T), see line 21 of Algorithm 4). The weight vectors 1510, 1512, and 1514 indicate whether the corresponding samples are assigned to the left subtree (if any of the slots has a value 1) or right subtree (if all slots have zeros) the node. The weight vectors 1510, 1512, and 1514 can be transformed to expanded weight vectors 1520, 1522, and 1524, respectively, by expanding a non-zero value in the original weight vector to all slots in the expanded weight vector. For example, the weight vector 1512 has a single 1 in slot 4. After expansion, the corresponding expanded weight vector 1522 has 1 in all four slots. As described above, such expansion can be optimized by pre-rotations (line 19 of Algorithm 4).

Based on the expanded weight vectors 1520, 1522, and 1524, the samples assigned to the left subtree and right subtree can be determined (lines 25-26 of Algorithm 4). For example, FIG. 15 shows two data sets 1530 and 1540. The data set 1530 includes the second sample vector 1322 and the corresponding target vector 1332, which are assigned to the left subtree. The data set 1540 includes the first and third sample vectors 1320, 1324 and the corresponding target vectors 1330, 1334, which are assigned to the right subtree. The algorithm 1200 can then recursively train the left and right subtrees.

Figure 16:
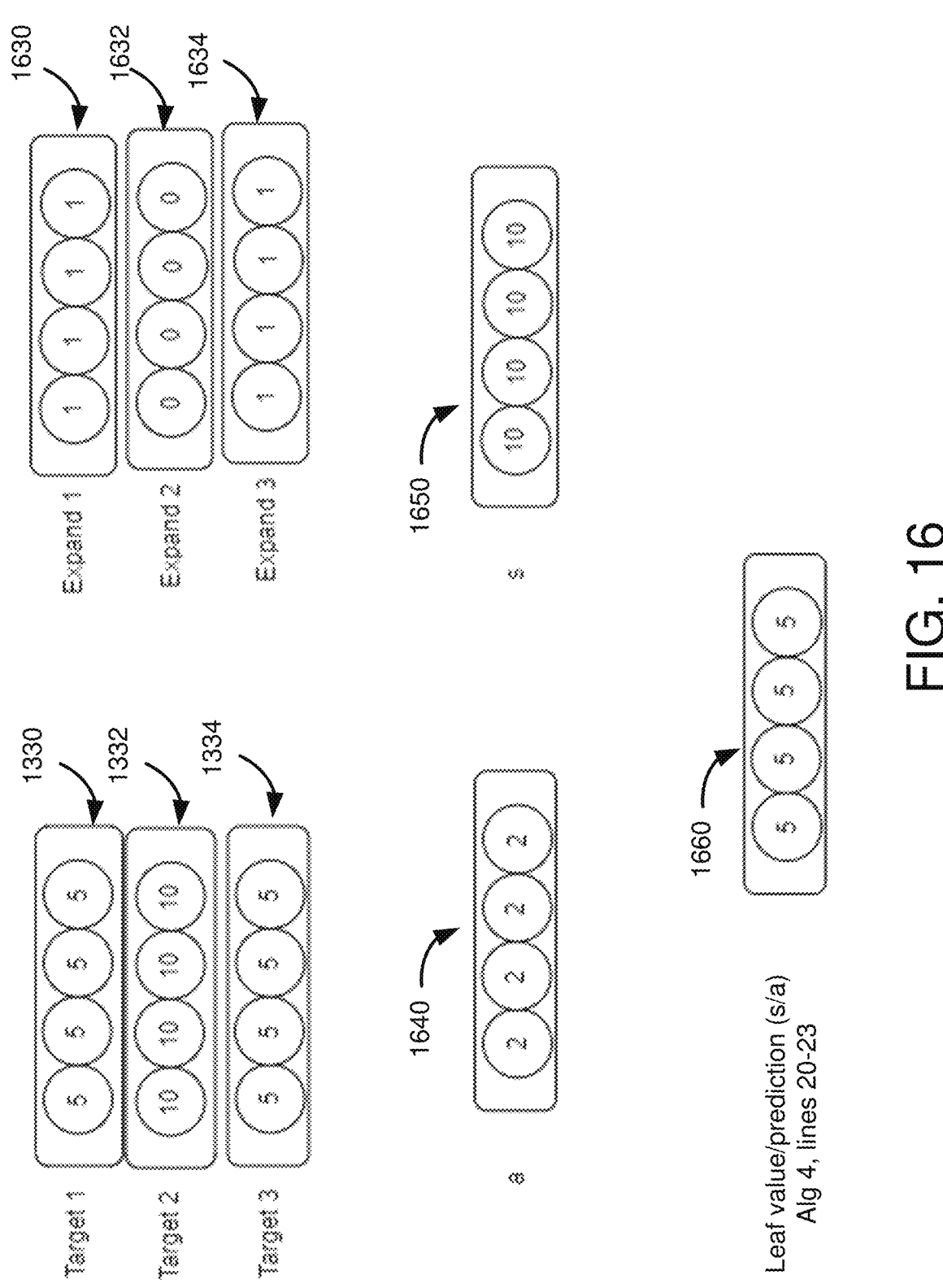
FIG. 16 depicts results of performing additional steps (following the steps of FIG. 15) of the fully homomorphic encryption training algorithm of FIG. 12.

Assuming the right subtree already reaches the leaf node (e.g., the stop criterion specified at line 1 of Algorithm 4 is satisfied), the average of all target values assigned to that leaf node needs to be calculated (line 2 of Algorithm 4). FIG. 16 illustrates steps involved in such calculation. As shown, the target vectors 1330, 1332, and 1334 have corresponding expanded weight vectors 1630, 1632, and 1634 (indicate which samples are in the right subtree), which are complements of the weight vectors 1520, 1522, and 1524 (line 22 of Algorithm 4). The sum of the weight vectors 1630, 1632, and 1634 results in a total count vector 1640, indicating the total number of active samples (e.g., 2 in this example) in that leaf node (i.e., $$a = \sum_{i=1}^{|W|} W_i,$$

see line 2 of Algorithm 4). FIG. 16 also shows a total sum vector 1650, which represents the sum of active target values in that leaf node. The total sum vector 1650 can be calculated as the sum of element-wise products (e.g., 10 in this example) between target vectors 1330, 1332, 1334 and corresponding weight vectors 1630, 1632, and 1634 (i.e., $$s = \sum_{i=1}^{|Z|} (Z_i \times W_i),$$

see line 2 of Algorithm 4). Finally, a prediction vector 1660 containing the average of target values (e.g., 5 in this example) in the leaf node is obtained, calculated as element-wise product of the total sum vector 1650 and an inverse of the total count vector 1640.

Example Advantages

A number of advantages can be achieved via the technologies described herein.

First, a privacy-preserving and non-interactive protocol for training and prediction on regression trees is introduced, which allows a client to send their encrypted inputs to a server and then go offline. This is a departure from the traditional approach where interaction is required, with the client decrypting intermediate results from the server and sending back the encrypted result of local evaluations. As a result, the technologies described herein can improve the efficiency of the training process, reduce the computational burden on the client side, and enhance data privacy by minimizing data exposure.

Second, the innovative solution disclosed herein provides efficient batching options (e.g., sample-wise batching, attribute-wise batching, and layer-wise batching) that support large data sizes and increase training throughput. These batching options can pack multiple plaintexts into a single ciphertext, thereby enabling parallel computation (e.g., testing multiple thresholds for an attribute using SIMD operations). As a result, the computational efficiency of FHE can be significantly improved. Furthermore, batching reduces the overall computational overhead and memory requirements, making the secure training and inference method disclosed herein more practical for large-scale applications.

Furthermore, the technologies described herein incorporate several optimizations that further enhance the runtime performance of secure training and inference. As described above, these optimizations avoid costly divisions, leverage symmetries in the tree structure to simplify computations, and perform computations with small upfront overhead (e.g., via pre-rotations) to speed up later computations. These enhancements collectively contribute to realizing privacy-preserving training with improved performance that are optimized for tree-based machine learning models.

Example Computing Systems

Figure 17:
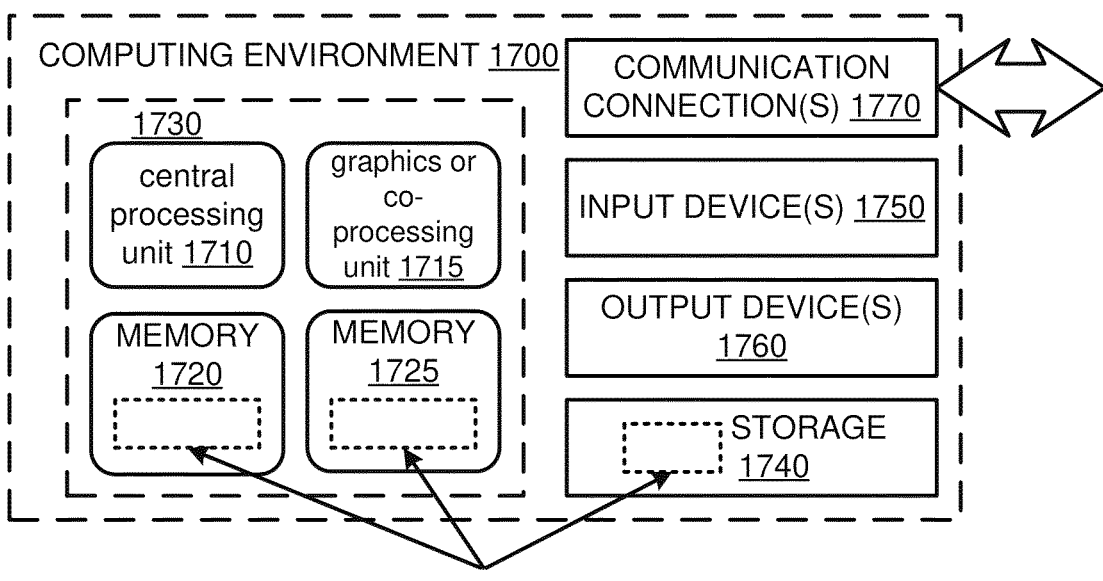
FIG. 17 is a block diagram of an example computing system in which described embodiments can be implemented.

FIG. 17 depicts an example of a suitable computing system 1700 in which the described innovations can be implemented. The computing system 1700 is not intended to suggest any limitation as to scope of use or functionality of the present disclosure, as the innovations can be implemented in diverse computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 can execute computer-executable instructions, such as for implementing the features described in the examples herein (e.g., the methods 200, 240, 270, the algorithms 600, 900, 1000, 1200, etc.). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 17 shows a central processing unit 1710 as well as a graphics processing unit or co-processing unit 1715. The tangible memory 1720, 1725 can be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 can store software 1780 implementing one or more innovations described herein, in the form of computer-executable instructions suitable for execution by the processing unit(s) 1710, 1715.

A computing system 1700 can have additional features. For example, the computing system 1700 can include storage 1740, one or more input devices 1750, one or more output devices 1760, and one or more communication connections 1770, including input devices, output devices, and communication connections for interacting with a user. An interconnection mechanism (not shown) such as a bus, controller, or network can interconnect the components of the computing system 1700. Typically, operating system software (not shown) can provide an operating environment for other software executing in the computing system 1700, and coordinate activities of the components of the computing system 1700.

The tangible storage 1740 can be removable or non-removable, and includes magnetic disks, magnetic tapes or cassettes, CD-ROMs, DVDs, or any other medium which can be used to store information in a non-transitory way and which can be accessed within the computing system 1700.

The storage 1740 can store instructions for the software implementing one or more innovations described herein.

The input device(s) 1750 can be an input device such as a keyboard, mouse, pen, or trackball, a voice input device, a scanning device, touch device (e.g., touchpad, display, or the like) or another device that provides input to the computing system 1700. The output device(s) 1760 can be a display, printer, speaker, CD-writer, or another device that provides output from the computing system 1700.

The communication connection(s) 1770 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 18:
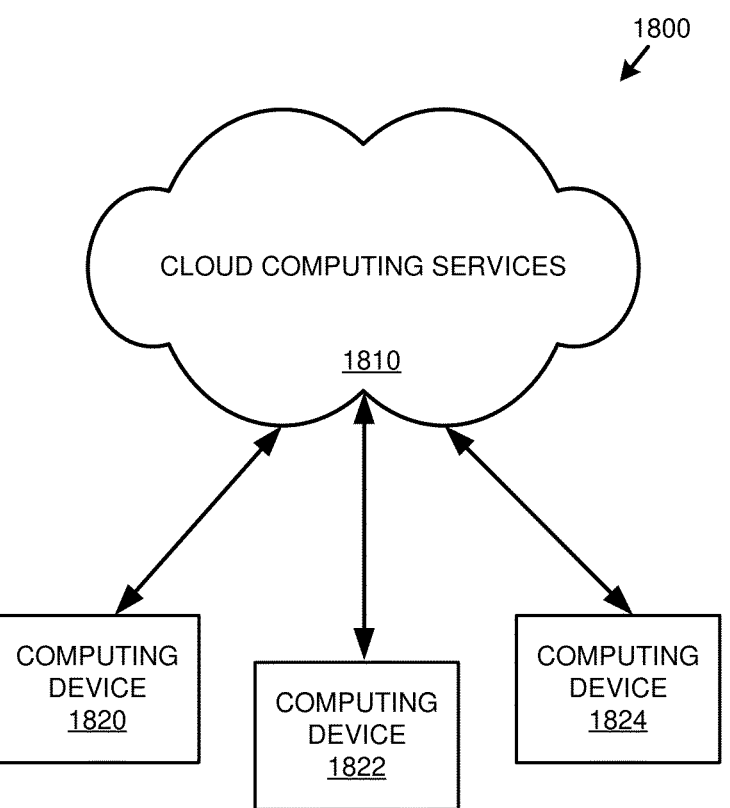
FIG. 18 is a block diagram of an example cloud computing environment that can be used in conjunction with the technologies described herein.

FIG. 18 depicts an example cloud computing environment 1800 in which the described technologies can be implemented, including, e.g., the system 100 and other systems herein. The cloud computing environment 1800 can include cloud computing services 1810.

The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 can be utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Clauses

Any of the following example clauses can be implemented.

Clause 1. A computer-implemented method comprising: receiving ciphertexts encrypted from training samples provided by one or more data owners; and training a regression tree using the ciphertexts, wherein the training is configured to encrypt the regression tree through homomorphic operations on the ciphertexts, wherein the training is performed independently by a server without interaction with the one or more data owners, wherein the training samples comprise sample values corresponding to multiple attributes and respective target values, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values.

Clause 2. The method of clause 1, further comprising generating the ciphertexts by performing probabilistic encryption of the training samples, wherein the probabilistic encryption introduces an initial level of noise into the ciphertexts, wherein the training further comprises: monitoring a noise level in the ciphertexts as the ciphertexts are modified by the homomorphic operations; and responsive to finding that the noise level exceeds a predetermined noise threshold, resetting the noise level in the ciphertexts to a level below the predetermined noise threshold.

Clause 3. The method of any one of clauses 1-2, wherein training the regression tree further comprises recursively splitting the inner nodes into respective pairs of child nodes based on test conditions represented by the corresponding inner nodes until a stopping criterion is met, wherein the stopping criterion specifies a maximum depth of the regression tree, wherein the child nodes define the leaf nodes when the stopping criterion is met.

Clause 4. The method of clause 3, wherein training the regression tree further comprises generating multiple sets of thresholds for the multiple attributes, respectively, wherein recursively splitting the inner nodes into respective pairs of child nodes comprises determining the test conditions represented by the inner nodes, wherein a test condition represented by a selected inner node specifies a selected attribute and a selected threshold, wherein the selected threshold is selected from one set of thresholds corresponding to the selected attribute, wherein a training sample is assigned to left or right child node of the selected inner node based on comparison of the selected threshold with a sample value of the training sample corresponding to the selected attribute.

Clause 5. The method of clause 4, wherein determining the test condition represented by the selected inner node comprises: evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

Clause 6. The method of any one of clauses 1-5, wherein training the regression tree further comprises calculating averages of target values of the training samples assigned to the leaf nodes.

Clause 7. The method of any one of clauses 1-6, further comprising: generating, by a trusted party, a crypto context which defines one or more cryptographic setup parameters; generating, by the trusted party, a pair of master public and private keys based on the crypto context; sending the master public key to the server and the one or more data owners, wherein the master public key is used by the one or more data owners to encrypt the training samples to generate the ciphertexts.

Clause 8. The method of clause 7, further comprising: sending the crypto context and the master public key from the trusted party to a data analyst; generating, by the data analyst, a pair of public and private keys based on the crypto context; and generating, by the trusted party, a re-encryption key based on the master public key and the public key generated by the data analyst.

Clause 9. The method of clause 8, further comprising: receiving, by the server, an encrypted query from the data analyst, wherein the encrypted query specifies a new sample comprising sample values corresponding to the multiple attributes; and generating, by the server, an encrypted prediction of a target value for the new sample using the regression tree.

Clause 10. The method of clause 9, further comprising: re-encrypting, by the server, the encrypted prediction of the target value using the re-encryption key to generate an encrypted result; and sending the encrypted result to the data analyst.

Clause 11. A computing system, comprising: memory; one or more hardware processors coupled to the memory; and one or more computer readable storage media storing instructions that, when loaded into the memory, cause the one or more hardware processors to perform operations comprising: receiving ciphertexts encrypted from training samples provided by one or more data owners; and training a regression tree using the ciphertexts, wherein the training is configured to encrypt the regression tree through homomorphic operations on the ciphertexts, wherein the training is performed independently by a server without interaction with the one or more data owners, wherein the training samples comprise sample values corresponding to multiple attributes and respective target values, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values.

Clause 12. The system of clause 11, wherein the operations further comprise generating the ciphertexts by performing probabilistic encryption of the training samples, wherein the probabilistic encryption introduces an initial level of noise into the ciphertexts, wherein the training further comprises: monitoring a noise level in the ciphertexts as the ciphertexts are modified by the homomorphic operations; and responsive to finding that the noise level exceeds a predetermined noise threshold, resetting the noise level in the ciphertexts to a level below the predetermined noise threshold.

Clause 13. The system of any one of clauses 11-12, wherein training the regression tree further comprises recursively splitting the inner nodes into respective pairs of child nodes based on test conditions represented by the corresponding inner nodes until a stopping criterion is met, wherein the stopping criterion specifies a maximum depth of the regression tree, wherein the child nodes define the leaf nodes when the stopping criterion is met.

Clause 14. The system of clause 13, wherein training the regression tree further comprises generating multiple sets of thresholds for the multiple attributes, respectively, wherein recursively splitting the inner nodes into respective pairs of child nodes comprises determining the test conditions represented by the inner nodes, wherein a test condition represented by a selected inner node specifies a selected attribute and a selected threshold, wherein the selected threshold is selected from one set of thresholds corresponding to the selected attribute, wherein a training sample is assigned to left or right child node of the selected inner node based on comparison of the selected threshold with a sample value of the training sample corresponding to the selected attribute.

Clause 15. The system of clause 14, wherein determining the test condition represented by the selected inner node comprises: evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

Clause 16. The system of any one of clauses 11-15, wherein training the regression tree further comprises calculating averages of target values of the training samples assigned to the leaf nodes.

Clause 17. The system of any one of clauses 11-16, wherein the operations further comprise: generating, by a trusted party, a crypto context which defines one or more cryptographic setup parameters; generating, by the trusted party, a pair of master public and private keys based on the crypto context; sending the master public key to the server and the one or more data owners, wherein the master public key is used by the one or more data owners to encrypt the training samples to generate the ciphertexts.

Clause 18. The system of clause 17, wherein the operations further comprise: sending the crypto context and the master public key from the trusted party to a data analyst; generating, by the data analyst, a pair of public and private keys based on the crypto context; and generating, by the trusted party, a re-encryption key based on the master public key and the public key generated by the data analyst.

Clause 19. The system of clause 18, wherein the operations further comprise: receiving, by the server, an encrypted query from the data analyst, wherein the encrypted query specifies a new sample comprising sample values corresponding to the multiple attributes; generating, by the server, an encrypted prediction of a target value for the new sample using the regression tree; re-encrypting, by the server, the encrypted prediction of the target value using the re-encryption key to generate an encrypted result; and sending the encrypted result to the data analyst.

Clause 20. One or more non-transitory computer-readable media having encoded thereon computer-executable instructions causing one or more processors to perform a method comprising: receiving ciphertexts encrypted from training samples provided by one or more data owners; and training a regression tree using the ciphertexts, wherein the training is configured to encrypt the regression tree through homomorphic operations on the ciphertexts, wherein the training is performed independently by a server without interaction with the one or more data owners, wherein the training samples comprise sample values corresponding to multiple attributes and respective target values, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values.

Clause 21. A computing system, comprising: memory; one or more hardware processors coupled to the memory; and one or more computer readable storage media storing instructions that, when loaded into the memory, cause the one or more hardware processors to perform operations comprising: receiving n training samples comprising sample values corresponding to m attributes and respective target values, wherein n and m are positive integers; duplicating the sample values corresponding to the m attributes; packing the sample values into ciphertexts based on a batching option; and training a regression tree using the ciphertexts, wherein the training is configured to encrypt the regression tree through homomorphic operations on the ciphertexts, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values, wherein the act of duplicating creates q copies of the sample values included in the n training samples for each attribute, wherein q defines a count of thresholds which are tested for each attribute to determine a test condition represented by an inner node corresponding to the attribute, wherein q is an integer that is greater than one, wherein testing the q thresholds for each attribute is performed in parallel.

Clause 22. The computing system of clause 21, wherein the batching option specifies an attribute-wise batching, by which n sample values from n training samples for each attribute are packed into one ciphertext.

Clause 23. The computing system of clause 21, wherein the batching option specifies a sample-wise batching, by which m×q sample values for each training sample are packed into one ciphertext.

Clause 24. The computing system of clause 21, wherein the batching option specifies a layer-wise batching, by which m×q sample values for each training sample are first packed into one vector, wherein vectors corresponding to the n training samples are duplicated to match a count of the leaf nodes, wherein duplicated vectors are further concatenated into a combined ciphertext for each layer of the regression tree.

Clause 25. The computing system of any one of clauses 21-24, wherein training the regression tree comprises: determining the test conditions represented by the inner nodes, wherein a test condition represented by a selected inner node specifies a selected attribute and a selected threshold, wherein the selected threshold is selected from q thresholds for the selected attribute; and determining whether a training sample is assigned to left or right child node of the selected inner node based on comparison of the selected threshold with a sample value of the training sample corresponding to the selected attribute, wherein determining the test condition represented by the selected inner node comprises: evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

Clause 26. The computing system of clause 25, wherein training the regression tree further comprises calculating averages of target values of the training samples assigned to the leaf nodes.

Clause 27. The computing system of any one of clauses 25-26, wherein determining the test condition represented by the selected inner node further comprises: forming a threshold vector comprising a plurality of thresholds to be tested for the selected attribute; evaluating split scores for the plurality of thresholds included in the threshold vector; and identifying a smallest split score among the split scores.

Clause 28. The computing system of clause 27, wherein determining the test condition represented by the selected inner node further comprises: arranging the split scores for the plurality of thresholds in a score vector; and converting the score vector to a minimum score vector in which all elements equal the smallest split score, wherein identifying the smallest split score and converting the score vector to the minimum score vector comprise iteratively performing element-wise comparison between the score vector and a rotated version of the score vector and updating the score vector based on the element-wise comparison.

Clause 29. The computing system of clause 28, wherein determining the test condition represented by the selected inner node further comprises: generating a one-hot vector which identifies a threshold in the threshold vector that is associated with the smallest split score, wherein generating the one-hot vector comprises performing element-wise comparison between the minimum score vector and the score vector before converting the score vector to the minimum score vector.

Clause 30. The computing system of clause 29, wherein training the regression tree further comprises pre-rotating the one-hot vector and the threshold vector before determining whether a training sample is assigned to left or right child node of the selected inner node.

Clause 31. A computer-implemented method comprising: receiving n training samples comprising sample values corresponding to m attributes and respective target values, wherein n and m are positive integers; duplicating the sample values corresponding to the m attributes; packing the sample values into ciphertexts based on a batching option; and training a regression tree using the ciphertexts, wherein the training is configured to encrypt the regression tree through homomorphic operations on the ciphertexts, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values, wherein the act of duplicating creates q copies of the sample values included in the n training samples for each attribute, wherein q defines a count of thresholds which are tested for each attribute to determine a test condition represented by an inner node corresponding to the attribute, wherein q is an integer that is greater than one, wherein testing the q thresholds for each attribute is performed in parallel.

Clause 32. The method of clause 31, wherein the batching option specifies an attribute-wise batching, by which n sample values from n training samples for each attribute are packed into one ciphertext.

Clause 33. The method of clause 31, wherein the batching option specifies a sample-wise batching, by which m×q sample values for each training sample are packed into one ciphertext.

Clause 34. The method of clause 31, wherein training the regression tree comprises: determining the test conditions represented by the inner nodes, wherein a test condition represented by a selected inner node specifies a selected attribute and a selected threshold, wherein the selected threshold is selected from q thresholds for the selected attribute; and determining whether a training sample is assigned to left or right child node of the selected inner node based on comparison of the selected threshold with a sample value of the training sample corresponding to the selected attribute, wherein determining the test condition represented by the selected inner node comprises: evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

Clause 35. The method of clause 34, wherein training the regression tree further comprises calculating averages of target values of the training samples assigned to the leaf nodes.

Clause 36. The method of any one of clauses 34-35, wherein determining the test condition represented by the selected inner node further comprises: forming a threshold vector comprising a plurality of thresholds to be tested for the selected attribute; evaluating split scores for the plurality of thresholds included in the threshold vector; and identifying a smallest split score among the split scores.

Clause 37. The method of clause 36, wherein determining the test condition represented by the selected inner node further comprises: arranging the split scores for the plurality of thresholds in a score vector; and converting the score vector to a minimum score vector in which all elements equal the smallest split score, wherein identifying the smallest split score and converting the score vector to the minimum score vector comprise iteratively performing element-wise comparison between the score vector and a rotated version of the score vector and updating the score vector based on the element-wise comparison.

Clause 38. The method of clause 37, wherein determining the test condition represented by the selected inner node further comprises: generating a one-hot vector which identifies a threshold in the threshold vector that is associated with the smallest split score, wherein generating the one-hot vector comprises performing element-wise comparison between the minimum score vector and the score vector before converting the score vector to the minimum score vector.

Clause 39. The method of clause 38, wherein training the regression tree further comprises pre-rotating the one-hot vector and the threshold vector before determining whether a training sample is assigned to left or right child node of the selected inner node.

Clause 40. One or more non-transitory computer-readable media having encoded thereon computer-executable instructions causing one or more processors to perform a method comprising: receiving n training samples comprising sample values corresponding to m attributes and respective target values, wherein n and m are positive integers; duplicating the sample values corresponding to the m attributes; packing the sample values into ciphertexts based on a batching option; and training a regression tree using the ciphertexts, wherein the training is configured to encrypt the regression tree through homomorphic operations on the ciphertexts, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values, wherein the act of duplicating creates q copies of the sample values included in the n training samples for each attribute, wherein q defines a count of thresholds which are tested for each attribute to determine a test condition represented by an inner node corresponding to the attribute, wherein q is an integer that is greater than one, wherein testing the q thresholds for each attribute is performed in parallel.

Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system, comprising:

memory;

one or more hardware processors coupled to the memory; and one or more computer readable storage media storing instructions that, when loaded into the memory, cause the one or more hardware processors to perform operations comprising:

receiving n training samples comprising sample values corresponding to m attributes and respective target values, wherein n and m are positive integers;

duplicating the sample values corresponding to the m attributes;

packing the sample values into ciphertexts based on a batching option; and training a regression tree using the ciphertexts, wherein the training is configured to encrypt the regression tree through homomorphic operations on the ciphertexts, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values, wherein the act of duplicating creates q copies of the sample values included in the n training samples for each attribute, wherein q defines a count of thresholds which are tested for each attribute to determine a test condition represented by an inner node corresponding to the attribute, wherein q is an integer that is greater than one, wherein testing the q thresholds for each attribute is performed in parallel, wherein training the regression tree comprises:

determining the test conditions represented by the inner nodes, wherein a test condition represented by a selected inner node specifies a selected attribute and a selected threshold, wherein the selected threshold is selected from q thresholds for the selected attribute; and determining whether a training sample is assigned to left or right child node of the selected inner node based on comparison of the selected threshold with a sample value of the training sample corresponding to the selected attribute, wherein determining the test condition represented by the selected inner node comprises:

evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

2. The computing system of claim 1, wherein the batching option specifies an attribute-wise batching, by which n sample values from n training samples for each attribute are packed into one ciphertext.

3. The computing system of claim 1, wherein the batching option specifies a sample-wise batching, by which m×q sample values for each training sample are packed into one ciphertext.

4. The computing system of claim 1, wherein the batching option specifies a layer-wise batching, by which m×q sample values for each training sample are first packed into one vector, wherein vectors corresponding to the n training samples are duplicated to match a count of the leaf nodes, wherein duplicated vectors are further concatenated into a combined ciphertext for each layer of the regression tree.

5. The computing system of claim 1, wherein training the regression tree further comprises calculating averages of target values of the training samples assigned to the leaf nodes.

6. The computing system of claim 1, wherein determining the test condition represented by the selected inner node further comprises:

forming a threshold vector comprising a plurality of thresholds to be tested for the selected attribute;

evaluating split scores for the plurality of thresholds included in the threshold vector; and identifying a smallest split score among the split scores.

7. The computing system of claim 6, wherein determining the test condition represented by the selected inner node further comprises:

arranging the split scores for the plurality of thresholds in a score vector; and converting the score vector to a minimum score vector in which all elements equal the smallest split score, wherein identifying the smallest split score and converting the score vector to the minimum score vector comprise iteratively performing element-wise comparison between the score vector and a rotated version of the score vector and updating the score vector based on the element-wise comparison.

8. The computing system of claim 7, wherein determining the test condition represented by the selected inner node further comprises:

generating a one-hot vector which identifies a threshold in the threshold vector that is associated with the smallest split score, wherein generating the one-hot vector comprises performing element-wise comparison between the minimum score vector and the score vector before converting the score vector to the minimum score vector.

9. The computing system of claim 8, wherein training the regression tree further comprises pre-rotating the one-hot vector and the threshold vector before determining whether a training sample is assigned to left or right child node of the selected inner node.

10. A computer-implemented method comprising:

receiving n training samples comprising sample values corresponding to m attributes and respective target values, wherein n and m are positive integers;

duplicating the sample values corresponding to the m attributes;

packing the sample values into ciphertexts based on a batching option; and training a regression tree using the ciphertexts, wherein the training is configured to encrypt the regression tree through homomorphic operations on the ciphertexts, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values, wherein the act of duplicating creates q copies of the sample values included in the n training samples for each attribute, wherein q defines a count of thresholds which are tested for each attribute to determine a test condition represented by an inner node corresponding to the attribute, wherein q is an integer that is greater than one, wherein testing the q thresholds for each attribute is performed in parallel, wherein training the regression tree comprises:

determining the test conditions represented by the inner nodes, wherein a test condition represented by a selected inner node specifies a selected attribute and a selected threshold, wherein the selected threshold is selected from q thresholds for the selected attribute; and determining whether a training sample is assigned to left or right child node of the selected inner node based on comparison of the selected threshold with a sample value of the training sample corresponding to the selected attribute, wherein determining the test condition represented by the selected inner node comprises:

evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

11. The method of claim 10, wherein the batching option specifies an attribute-wise batching, by which n sample values from n training samples for each attribute are packed into one ciphertext.

12. The method of claim 10, wherein the batching option specifies a sample-wise batching, by which m×q sample values for each training sample are packed into one ciphertext.

13. The method of claim 10, wherein training the regression tree further comprises calculating averages of target values of the training samples assigned to the leaf nodes.

14. The method of claim 10, wherein determining the test condition represented by the selected inner node further comprises:

forming a threshold vector comprising a plurality of thresholds to be tested for the selected attribute;

evaluating split scores for the plurality of thresholds included in the threshold vector; and identifying a smallest split score among the split scores.

15. The method of claim 14, wherein determining the test condition represented by the selected inner node further comprises:

arranging the split scores for the plurality of thresholds in a score vector; and converting the score vector to a minimum score vector in which all elements equal the smallest split score, wherein identifying the smallest split score and converting the score vector to the minimum score vector comprise iteratively performing element-wise comparison between the score vector and a rotated version of the score vector and updating the score vector based on the element-wise comparison.

16. The method of claim 15, wherein determining the test condition represented by the selected inner node further comprises:

generating a one-hot vector which identifies a threshold in the threshold vector that is associated with the smallest split score, wherein generating the one-hot vector comprises performing element-wise comparison between the minimum score vector and the score vector before converting the score vector to the minimum score vector.

17. The method of claim 16, wherein training the regression tree further comprises pre-rotating the one-hot vector and the threshold vector before determining whether a training sample is assigned to left or right child node of the selected inner node.

18. One or more non-transitory computer-readable media having encoded thereon computer-executable instructions causing one or more processors to perform a method comprising:

receiving n training samples comprising sample values corresponding to m attributes and respective target values, wherein n and m are positive integers;

duplicating the sample values corresponding to the m attributes;

packing the sample values into ciphertexts based on a batching option; and training a regression tree using the ciphertexts, wherein the training is configured to encrypt the regression tree through homomorphic operations on the ciphertexts, wherein the regression tree comprises nodes organized in multiple layers and edges connecting between some of the nodes, wherein the nodes comprise one or more inner nodes and a plurality of leaf nodes, wherein an inner node has two child nodes, wherein a leaf node has no child node, wherein the inner nodes represent test conditions for corresponding attributes, the edges represent outcomes of evaluating the sample values based on the test conditions, and the leaf nodes represent predictions of the target values, wherein the act of duplicating creates q copies of the sample values included in the n training samples for each attribute, wherein q defines a count of thresholds which are tested for each attribute to determine a test condition represented by an inner node corresponding to the attribute, wherein q is an integer that is greater than one, wherein testing the q thresholds for each attribute is performed in parallel, wherein training the regression tree comprises:

determining the test conditions represented by the inner nodes, wherein a test condition represented by a selected inner node specifies a selected attribute and a selected threshold, wherein the selected threshold is selected from q thresholds for the selected attribute; and determining whether a training sample is assigned to left or right child node of the selected inner node based on comparison of the selected threshold with a sample value of the training sample corresponding to the selected attribute, wherein determining the test condition represented by the selected inner node comprises:

evaluating a split score based on a mean squared error between target values of the training samples that are respectively assigned to left and right child nodes of the selected inner node and predicted target values; and choosing the selected attribute and the selected threshold, among a plurality of possible attribute and threshold combinations, that minimize the split score.

\* \* \* \* \*